(12) United States Patent
Engel et al.

(10) Patent No.: US 12,332,882 B1
(45) Date of Patent: Jun. 17, 2025

(54) DIRECTED ACYCLIC GRAPH FRAMEWORK FOR EXECUTING SEARCH FUNCTION OPERATIONS

(71) Applicant: Dropbox, Inc., San Francisco, CA (US)

(72) Inventors: Harrison Engel, El Paso, TX (US); Ivan Traus, San Francisco, CA (US); Jongmin Baek, Foster City, CA (US); Sarah Andrabi, Seattle, WA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 18/434,508

(22) Filed: Feb. 6, 2024

(51) Int. Cl.
*G06F 16/24* (2019.01)
*G06F 9/52* (2006.01)
*G06F 16/2453* (2019.01)
*G06F 21/62* (2013.01)

(52) U.S. Cl.
CPC ........ *G06F 16/24532* (2019.01); *G06F 9/524* (2013.01); *G06F 21/6218* (2013.01); *G06F 2221/2141* (2013.01)

(58) Field of Classification Search
CPC ............... G06F 16/24532; G06F 9/254; G06F 21/6218; G06F 2221/2141
See application file for complete search history.

(56) References Cited

U.S. PATENT DOCUMENTS

| | | | |
|---|---|---|---|
| 7,814,087 B2 | 10/2010 | Henriot | |
| 10,007,852 B2 | 6/2018 | Chen et al. | |
| 11,115,218 B2 * | 9/2021 | Nixon | H04L 63/123 |
| 11,164,348 B1 | 11/2021 | Chen et al. | |
| 11,240,025 B2 * | 2/2022 | Wentz | G06F 21/602 |
| 11,327,966 B1 * | 5/2022 | O'Krafka | G06F 11/1471 |
| 11,360,980 B2 | 6/2022 | Fitchett | |

(Continued)

FOREIGN PATENT DOCUMENTS

| | | |
|---|---|---|
| CN | 103034614 B | 12/2016 |
| CN | 111027703 A | 4/2020 |

(Continued)

OTHER PUBLICATIONS

Ding Y., et al., "Dagbase: A Decentralized Database Platform Using DAG-Based Consensus," IEEE 44th Annual Computers, Software, and Applications Conference (COMPSAC, 2020, pp. 798-807.

(Continued)

*Primary Examiner* — Eliyah S. Harper
(74) *Attorney, Agent, or Firm* — Keller Preece PLLC

(57) ABSTRACT

The present disclosure is directed toward systems, methods, and non-transitory computer-readable media for performing a data search for a search request by utilizing a directed acyclic graph. For example, the disclosed systems receive a search request at a search engine of a content management system. In addition, the disclosed systems determine (e.g., in response to the search request) a node path from a directed acyclic graph that includes a plurality of interconnected nodes defining computer operations. Further, the determined node path includes a set of nodes that corresponds to the search request. Moreover, the disclosed systems perform the data search for the search request by executing operations defined by nodes along the node path within the directed acyclic graph.

20 Claims, 10 Drawing Sheets

(56) References Cited

U.S. PATENT DOCUMENTS

| | | | |
|---|---|---|---|
| 11,704,313 B1* | 7/2023 | Andrade | G06F 16/24535 |
| | | | 707/714 |
| 11,797,618 B2 | 10/2023 | Pal et al. | |
| 12,093,231 B1* | 9/2024 | Kondiles | G06F 16/219 |
| 2011/0060750 A1 | 3/2011 | Kuhn et al. | |
| 2019/0311058 A1* | 10/2019 | Corradi | G06F 16/2282 |
| 2021/0073226 A1* | 3/2021 | Chavan | G06F 16/24569 |
| 2021/0208860 A1* | 7/2021 | Freeman | G06F 9/5055 |
| 2022/0164465 A1* | 5/2022 | Prettejohn | G06F 21/6218 |
| 2022/0374535 A1* | 11/2022 | Jagasia | G06F 21/604 |
| 2023/0306030 A1* | 9/2023 | Korus | G06F 21/6227 |
| 2024/0111745 A1* | 4/2024 | Wendel, III | G06F 16/24558 |
| 2025/0036622 A1* | 1/2025 | Dhuse | G06F 16/24568 |
| 2025/0045445 A1* | 2/2025 | Srinivasan | G06F 21/6227 |

FOREIGN PATENT DOCUMENTS

| | | |
|---|---|---|
| CN | 114494506 A | 5/2022 |
| CN | 115795105 A | 3/2023 |
| CN | 112784949 B | 8/2023 |
| CN | 112115171 B | 11/2023 |
| CN | 117224961 A | 12/2023 |
| WO | 2023124253 A1 | 7/2023 |

OTHER PUBLICATIONS

Xiao Y., et al., "A Survey on One-shot Neural Architecture Search," IOP Conference Series: Materials Science and Engineering, 2020, 750(012223), 8 pages.

* cited by examiner

DIRECTED ACYCLIC GRAPH FRAMEWORK FOR EXECUTING SEARCH FUNCTION OPERATIONS

BACKGROUND

Advancements in computing devices and networking technology have led to a variety of innovations in search engine capabilities. Indeed, search engines existing search systems can process massive amounts of data in storage databases to populate search results from digital content relevant to a search query. Despite their developments, many existing systems still suffer from a variety of technical deficiencies regarding speed, security, and stability.

As just suggested, many existing search systems have slow performance, especially at scales with high search request volume and/or for massive data applications. Specifically, the logical architectures of existing search systems make them susceptible high latencies (or slow speeds) due various factors, including execution of redundant and/or superfluous operations. For example, due to the structure of their operational code, existing search systems often apply a one-size-fits all sequence of search operations to perform a data search, regardless of whether certain operations in the sequence are repeated and/or needless to generate search results for a particular request. In addition, the operational code of many existing search systems is not adaptable to (cannot accommodate) massive parallelization of search operations. Indeed, identifying parallelizable operations at large scales is non-trivial, and implementing such large-scale parallelization is often impossible with the limited code architectures of existing systems. This poor code construction often results in slow data searches that exhibit high latencies and that also consume excessive computational resources, further rendering many existing systems unscalable for applications of larger sizes and/or for accommodating large amounts of network traffic.

In addition to latency problems, some existing search systems also suffer from stability and security issues. Indeed, because the code architecture of many existing search systems cannot handle processing data at very large scales (e.g., due to their series-based or sequential orders of operations), operations within these systems often glitch, produce errors, or crash entirely in high volume situations and/or for large applications. When such errors occur, the architectural limitations of existing systems frequently cause crashes to entire programs due to the unscalable nature of code structures that are over-reliant on series operations and/or otherwise not massively parallelizable. In some cases, crashes or other stability issues manifest as erroneously generated outputs that sometimes include content items that should be inaccessible during proper operation. For instance, a crash may cause an existing system to fail an authorization check and erroneously generate a search result for a user account where the search result includes digital content designated as inaccessible to the user account.

SUMMARY

This disclosure describes one or more embodiments of systems, methods, and non-transitory computer-readable storage media that provide benefits and/or solve one or more of the foregoing and other problems in the art. For instance, the disclosed systems build or provide a directed acyclic graph (DAG) that contains a plurality of nodes for massively parallelizing execution of search operations. For example, the disclosed systems receive a search request and generate a search result responsive to the search request by determining, and executing operations along, a node path within the DAG that navigates from available input data (e.g., from the search request) to requested output data indicated by the search request. In particular, the disclosed systems use a DAG with interconnected nodes where the output of one node becomes an input to another node, and where all of the nodes together define a search operation for a search request. In some embodiments, the nature of the DAG allows for the disclosed systems to execute many operations in parallel which greatly reduces latencies and to generate search results faster.

BRIEF DESCRIPTION OF THE DRAWINGS

This disclosure will describe one or more example implementations of the systems and methods with additional specificity and detail by referencing the accompanying figures. The following paragraphs briefly describe those figures, in which.

DETAILED DESCRIPTION

Figure 1:
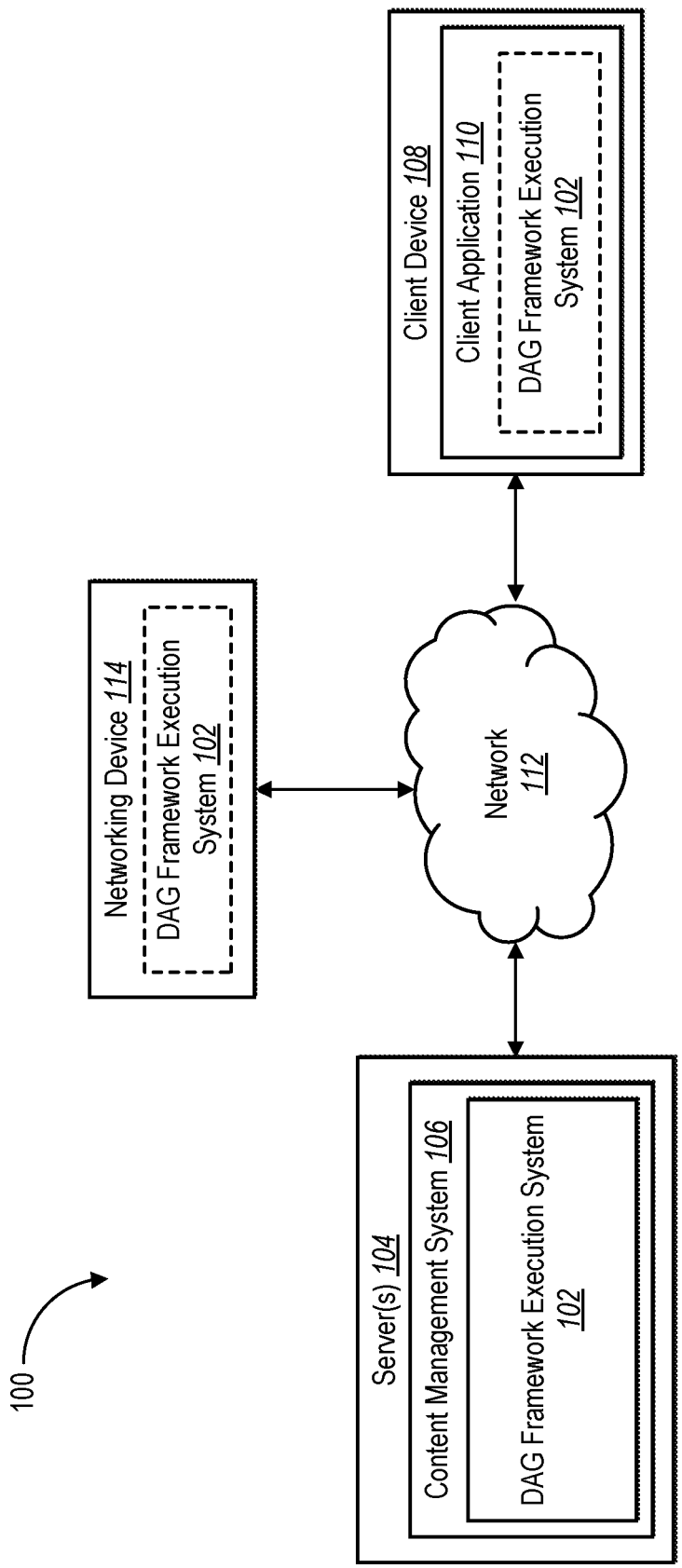
FIG. 1 illustrates a schematic diagram of an example environment of a DAG framework execution system in accordance with one or more embodiments.

This disclosure describes one or more embodiments of a DAG framework execution system that can generate and/or provide a directed acyclic graph (DAG) made up of interconnected nodes for massively parallelizing operations of search functions. For example, the DAG framework execution system builds a (or provides a pre-built) DAG with self-contained, compartmentalized nodes made up of computer code that define their respective computer operations, including input data, output data, and processes performed on the input data to produce the output data. As constructed, a DAG can include multiple possible node paths executable in response to a search request to generate a requested output. Indeed, in response to receiving a search request, the DAG framework execution system determines a node path of operations to execute, including an initial node that ingests initial data for the search request, an output node that generates the final output for the search request, and a number of intermediate nodes for traversing the DAG as quickly as possible from the initial node to the final node. As part of DAG functionality, in some embodiments, the DAG framework execution system provides developer tools for building and/or modifying DAG nodes to reduce latency, fix bugs, identify bottlenecks, and/or otherwise improve search performance through execution of DAG-defined operations.

As just mentioned, the DAG framework execution system can generate and/or provide DAGs for large-scale parallelization of computer applications for search functions. Indeed, in some embodiments, the DAG framework execution system scales a DAG to a massive application size for large computing environments, such as those for commercial or industrial software applications. For example, the DAG framework execution system builds the DAG as a defined computer code language structure that contains interconnected nodes. The interconnected nodes each define their own respective operation such that the overall DAG lays out a number of potential flows of operations that the system can execute for a search request.

As indicated, the DAG framework execution system can utilize the DAG in response to a search request. For example, the DAG framework execution system receives a search request from a client device or from a backend network device. In either case, the DAG framework execution system processes the search request to determine a node path from an initial node to a final node within the DAG. The DAG framework execution system can identify an initial node as a node compatible with ingesting input data indicated by the search request and can identify a final node as a node that generates a requested output. The DAG framework execution system can thus perform a search function in response to the search request by executing the operations defined by nodes along the node path.

As part of executing a node path, the DAG framework execution system can parallelize multiple nodes of the DAG (e.g., at very large scales). Specifically, the DAG framework execution system can contemporaneously or concurrently execute multiple operations of parallelizable nodes in parallel as part of a data search. For example, the DAG framework execution system performs multiplexing operations to determine which nodes are compatible with parallelization by combining multiple independent signals or data streams into a single transmission medium. Thus, in response to a search request (or as part of initially constructing the DAG), the DAG framework execution system determines which node operations to parallelize (e.g., for a single output sent to an arbitrary number of routines/nodes running in parallel) and which to run in series. Unlike prior systems, the DAG framework execution system can automatically perform this parallelization process without intervention by client devices or administrator accounts.

In some embodiments, the DAG framework execution system executes node operations based on various factors. For example, different nodes may have different execution times as well as different input and output data, as defined by their own specific code segments. In addition, the DAG framework execution system monitors resource availability and latency of devices (e.g., network devices and/or virtual machines) designated for executing various nodes. Depending on the different execution parameters (e.g., input data, output data, execution time, resource availability, and/or placement within a node path) of respective nodes, some nodes are parallelizable for a search request while others are not. For instance, two nodes which each ingest input data in the form of the same output data may be executed in parallel, assuming computational resources are available to assign. The DAG framework execution system thus determines (e.g., on the fly in response to a search request) a node path that includes some node operations to execute in parallel and others to execute in series with the goal of generating a requested output as fast as possible (e.g., by finding the fastest node path through the DAG). In some cases, depending on the search request, the makeup of the DAG, and the data involved, the DAG framework execution system can execute a massive number of operations in parallel at speeds and scales beyond the capabilities of prior systems.

To facilitate parallelization at such scales, the DAG framework execution system circumvents the rigidity of most conventionally constructed parallel code by constructing a DAG using statically typed computer code where the type of a variable in a node is known and checked at compile time rather than at runtime. In addition to static node-level checks, the DAG framework execution system 102 can perform static validity checks at the graph level for the overall DAG prior to the execution of operations to prevent hanging nodes and to ensure generation of a valid output. Additionally, in some embodiments, the DAG framework execution system 102 defines a DAG using computer code abstractions that conform to idiomatic patterns (specific to a computer language for constructing the DAG, such as the Go Programming Language) for contexts and errors to allow for seamless porting of computer code in the DAG.

As mentioned above, the DAG framework execution system can provide several improvements or advantages over existing search systems. For example, the DAG framework execution system greatly improves or reduces latencies by increasing the speed of data searches, especially at large scales. Specifically, the DAG framework execution system uses a unique code structure in the form of a DAG defined to lay out interconnected nodes of self-contained computer operations executable in response to a search request. Using the DAG structure, the DAG framework execution system improves the speed of returning search results by massively parallelizing search operations. Unlike prior systems that implement a one-size-fits-all approach to data searches which often results in executing redundant and/or superfluous processes (mostly in series), the DAG framework execution system analyzes a search request to automatically (and on the fly) determine a request-specific node path through the DAG to generate a requested output. Indeed, for reach request, the DAG framework execution system automatically determines which nodes to parallelize (based on which nodes process the outputs of other nodes and/or based on node-specific execution time) along the node path, which results in greatly increased search speeds, especially at large scales where many operations are performed in a large computer application with high network traffic.

In addition to improving speed and latency, the DAG framework execution system also improves upon stability and security in relation to prior systems. Whereas prior systems often produce glitches, errors, and/or program crashes due to their inability to operate at scale, the DAG framework execution system is much more capable of massive parallelization for very large scale searches. Consequently, the DAG framework execution system is also much more stable than its predecessors, exhibiting low latency even for large data searches with many operations. The DAG framework execution system is thus more secure than prior systems as well due to its stability which aids in crash prevention and error resolution which, in prior systems, can result in providing unauthorized data to user accounts.

Due at least in part to improving scalability and security, the DAG framework execution system improves upon reliability of existing search systems. By intelligently and automatically determining a node path through a DAG, the DAG framework execution system prevents deadlocks where two or more processes are unable to proceed because each is waiting for the other to release a resource or generate an output. The DAG framework execution system also prevents double execution to save computational resources by determining a node path and parallelizing node-specific operations. Further consequences of determining a node path include preventing memory leaks where a computing system fails to release or deallocate memory when it is no longer needed, and preventing process leaks where a computing system fails to release system resources that are no longer needed.

Additional detail regarding the DAG framework execution system will now be provided with reference to the figures. For example, FIG. 1 illustrates a schematic diagram of an example system environment for implementing a DAG framework execution system 102 in accordance with one or more implementations. An overview of the DAG framework execution system 102 is described in relation to FIG. 1. Thereafter, a more detailed description of the components and processes of the DAG framework execution system 102 is provided in relation to the subsequent figures.

FIG. 1 illustrates an environment 100 that includes server(s) 104 for executing or performing operations for the DAG framework execution system 102. Within the environment 100, FIG. 1 further shows a content management system 106, a client device 108, a client application 110, a network 112, and a networking device 114. Each of the components of the environment 100 can communicate via the network 112, and the network 112 may be any suitable network over which computing devices can communicate. Example networks are discussed in more detail below in relation to FIGS. 9-10.

As mentioned above, the environment 100 includes the client device 108. The client device 108 can be one of a variety of computing devices, including a smartphone, a tablet, a smart television, a desktop computer, a laptop computer, a virtual reality device, an augmented reality device, or another computing device as described in relation to FIGS. 9-10. The client device 108 can communicate with the server(s) 104 via the network 112. For example, the client device 108 can receive user input from a user interacting with the client device 108 (e.g., via the client application 110) to, for instance, input a prompt or to select user interface elements for interacting with the content management system 106 (e.g., for submitting a search request). In addition, the client device 108 can provide, and DAG framework execution system 102 can receive, information relating to the various interactions via the client application 110 (e.g., for submitting a search request).

As shown, the client device 108 can include the client application 110. In particular, the client application 110 may be a web application, a native application installed on the client device 108 (e.g., a mobile application, a desktop application, etc.), or a cloud-based application where all or part of the functionality is performed by the server(s) 104. Based on instructions from the client application 110, the client device 108 can present or display information, including a user interface for submitting search requests. Using the client application, the client device 108 can perform (or request to perform) various operations, such as searching the content management system 106 for a specific type of content item.

As illustrated in FIG. 1, the environment 100 also includes the server(s) 104. The server(s) 104 may generate, track, store, process, receive, and transmit electronic data, such as search requests, interactions with interface elements, computer code used to define a DAG, and node-specific statistics (e.g., timing statistics related to executing one or more nodes). For example, the server(s) 104 may receive an indication from the client device 108 of a search request. In addition, the server(s) 104 can transmit data to the client device 108 in the form of output data responsive to the search request. Indeed, the server(s) 104 can communicate with the client device 108 to send and/or receive data via the network 112. In some implementations, the server(s) 104 comprise(s) a distributed server where the server(s) 104 include(s) a number of server devices distributed across the network 112 and located in different physical locations. The server(s) 104 can comprise one or more content servers, application servers, container orchestration servers, communication servers, web-hosting servers, machine learning server, and other types of servers.

As shown in FIG. 1, the server(s) 104 can also include the DAG framework execution system 102 as part of the content management system 106. The content management system 106 can communicate with the client device 108 to perform various functions associated with the client application 110 such as locating content items, generating shared folders, and sharing folders between different computing devices. Indeed, the content management system 106 can include a network-based smart cloud storage system to manage, store, and maintain content items and related data across numerous user accounts. In some embodiments, the DAG framework execution system 102 and/or the content management system 106 utilize a database to store and access information such as content items, search requests, and activity performed by one or more computing devices.

As further illustrated, the environment 100 includes the networking device 114. In particular, the networking device 114 includes one or more computing devices that communicate and exchange data with other computer networks (e.g., the server(s) 104 or the client device 108). For example, the networking device 114 can include backend devices (e.g., communicating via application programming interfaces) such as a router, a load balancer, an analytics database (SQL database), a proxy server, and/or a gateway. As another example, the networking device 114 can be a software-based entity or networking component, such as a virtual machine or a subcomponent of a virtual machine, such as one hosted by AMAZON WEB SERVICES or MICROSOFT AZURE. In other words, the networking device 114 can include any devices that operate behind the scenes and perform data searches via the DAG framework execution system 102.

Although FIG. 1 depicts the DAG framework execution system 102 located on the server(s) 104, in some implementations, the DAG framework execution system 102 may be implemented by (e.g., located entirely or in part on) one or more other components of the environment 100. For example, the DAG framework execution system 102 may be implemented by the client device 108, the networking device 114, and/or a third-party system. For example, the client device 108 and/or a third-party system can download all or part of the DAG framework execution system 102 for implementation independent of, or together with, the server(s) 104.

In some implementations, though not illustrated in FIG. 1, the environment 100 may have a different arrangement of components and/or may have a different number or set of components altogether. For example, the client device 108 may communicate directly with the DAG framework execution system 102, bypassing the network 112. In addition, the environment 100 can include a database located external to the server(s) 104 (e.g., in communication via the network 112) or located on the server(s) 104 and/or on the client device 108.

Figure 2:
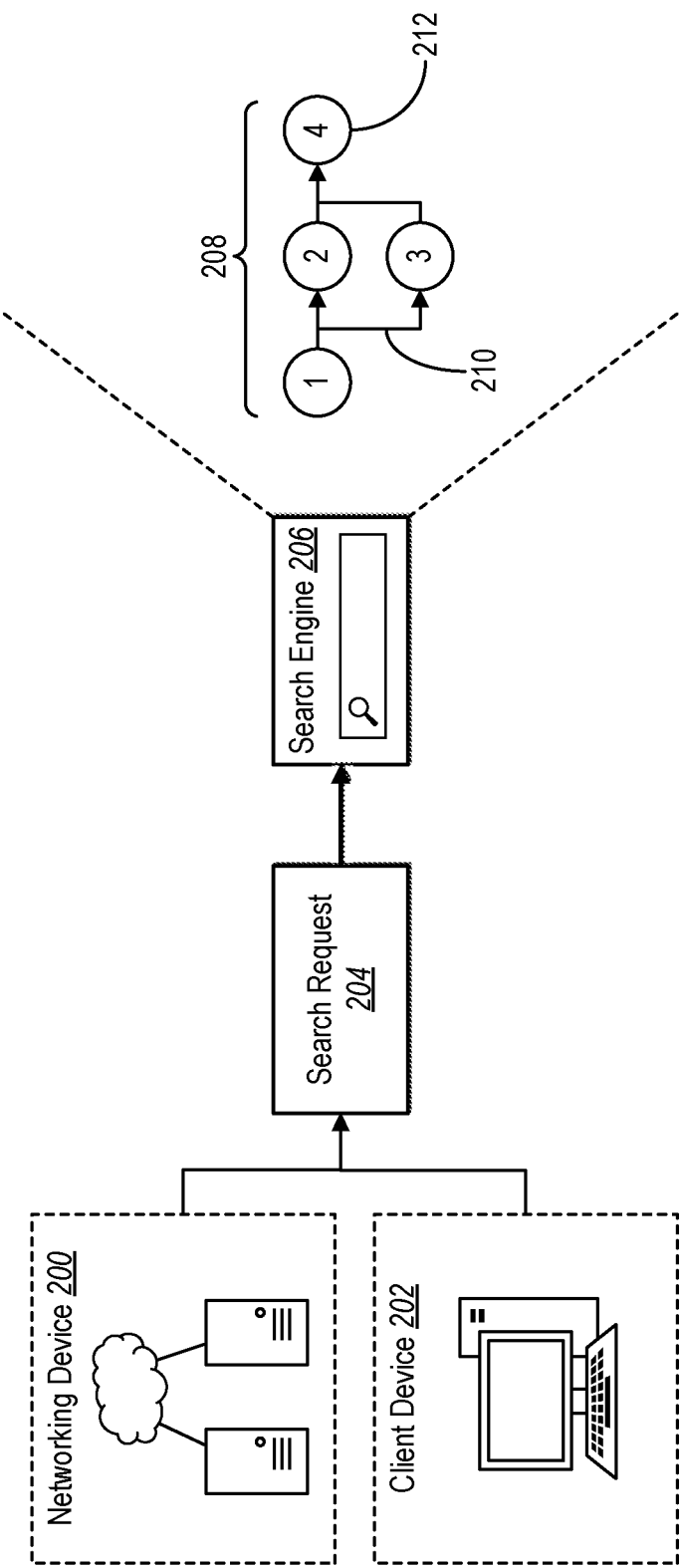
FIG. 2 illustrates an example overview of the DAG framework execution system receiving a search request and utilizing a search engine to perform a data search in accordance with one or more embodiments.

As mentioned above, the DAG framework execution system 102 receives a search request and utilizes a DAG to perform a data search that corresponds to the search request. FIG. 2 illustrates an overview of DAG framework execution system 102 performing a data search responsive to a search request in accordance with one or more embodiments. Additional detail regarding the various acts and processes described in relation to FIG. 2 is provided thereafter with reference to subsequent figures.

FIG. 2 shows the DAG framework execution system 102 receiving a search request 204 from a client device 202. In one or more embodiments, "a client device" refers to a computing device operated by one or more user accounts that requests the DAG framework execution system 102 to retrieve one or more content items. For example, in some instances, the client device 202 sends input to the DAG framework execution system 102 in the form of the search request 204. Moreover, in some embodiments, the client device 202 includes a front-end interface (e.g., a software application that users of the client device 202 interact with directly) where users of the client device 202 request for the DAG framework execution system 102 to retrieve one or more content items.

In one or more embodiments, the term "search request" refers to one or more data packets sent from a computing device to the DAG framework execution system that cause or initiate execution of search operations. For example, the search request 204 refers to (or is generated from) a query or a prompt that includes keywords or phrases related to information requested by a computing device. The search request 204 can also or alternatively include data packets from a backend network device or virtual machine that utilizes a search engine within the DAG framework execution system 102 for executing various functions. Further, in some embodiments, the search request 204 includes modifiers that include tailoring the request to a specific type of content, and location specific searches include directing the DAG framework execution system 102 to locate a content item in a specific digital location. Moreover, in some embodiments, the search request 204 includes initialization data and requested output data, which is explained in more detail below.

As further shown in FIG. 2, in some embodiments, the DAG framework execution system 102 receives the search request 204 from a networking device 200. In one or more embodiments, a "networking device" refers to a backend (e.g., not user facing) computing device that submits a search request for a search engine to perform as part of executing or performing a larger function or operation. In contrast to the client device 202, in some embodiments, the networking device 200 refers to a backend component (e.g., an application that operates behind the scenes to manage data, execute application logic, and communicate with external applications). In other words, in some embodiments, the DAG framework execution system 102 receives the search request from the networking device 200 (e.g., rather than from the client device 202) to obtain search results and utilize the search results in a backend function (e.g., an application programming interface call to communicate with other backend components). Moreover, in some embodiments, the networking device 200 exists as part of the content management system and assists the DAG framework execution system 102 in performing backend search functions to locate one or more content items in the content management system.

In response to the search request 204, the DAG framework execution system 102 utilizes a search engine 206 to perform a data search. In one or more embodiments, a "search engine" refers to a software application (run on one or more server devices and/or by one or more virtual machines) for computing devices that retrieves specifically requested data from a content management system. For example, the search engine 206 searches one or more databases that store content items such as documents, images, videos, and audio. In response to the search request 204, the search engine 206 crawls/parses through data of a content management system to index the data and create a structured database that maps keywords (e.g., extracted from metadata of the content items or extracted from a machine learning analysis of the content items) to various content item types within the content management system. The search engine 206 can also retrieve or identify stored content items for other operations as well, such as determining information about a user account, determining content availability, and/or performing other functions beyond populating search results for a client-device-submitted search request.

In some embodiments, the search engine 206 manages and indexes a database within a content management system to keep the database up to date. Specifically, the search engine 206 continuously crawls the content management system and updates the stored information within the indexed database. In addition, the search engine 206 can utilize a ranking algorithm to identify the most relevant content items and provides the obtained results to a computing device. Furthermore, in some embodiments, the search engine 206 processes the search request 204 to understand the intent of a computing device and further parses the content management system to conform with intent of the computing device.

As mentioned, the DAG framework execution system 102 utilizes the search engine 206 to search for content items from a content management system. In one or more embodiments, the term "content management system" refers to a set of software applications, network devices, and cloud data management servers, that facilitate the storage, creation, modification, sharing, collaboration, and organization of digital content items. For example, the content management system provides a central point to manage a plurality of content items that contain text, images, videos, and various types of content. In one or more embodiments, the content management system contains a large volume of data and the DAG framework execution system 102 via the content management system further provides search functionality to locate one or more digital content items.

In one or more embodiments, the term "digital content item" (or simply "content item") refers to a digital object or a digital file that includes information interpretable by a computing device (e.g., a client device) to present information to a user. A content item can include a file such as a digital text file, a digital image file, a digital audio file, a webpage, a website, a digital video file, a web file, a link, a digital document file, or some other type of file or digital object. A content item can have a particular file type or file format, which may differ for different types of digital content items (e.g., digital documents. digital images, digital videos, or digital audio files). In some cases, a content item can refer to a remotely stored (e.g., cloud-based) item or a link (e.g., a link to a cloud-based item or a web-based content item) and/or a content clip that indicates (or links) a discrete selection or segmented sub-portion of content from a webpage or some other content item or source. A content item can be editable or otherwise modifiable and can also be sharable from one user account (or client device) to another. In some cases, a content item is modifiable by multiple user accounts (or client devices) simultaneously and/or at different times.

In one or more embodiments, the term "directed acyclic graph" (referred to as DAG) refers to a data structure defined in a particular programming language (e.g., Go) that includes nodes connected by edges, where each node represents or defines its own self-contained computer operation. In some embodiments, a DAG 208 includes unidirectional edges that indicate a single direction relationship between nodes. In some cases, the DAG 208 is "directed" in that a node given points to one or more additional nodes and is "acyclic" in that it includes no logical loops or repeating cycles where execution of downstream nodes returns to upstream nodes.

Relatedly, as used herein, the term "node" refers to a compartmentalized, self-contained segment of computer code within a DAG that defines a computer operation, including input data, output data, and operations on input data to produce the output data. For example, a node in a DAG generates output data that is passable from one node to the next along a node path. In some cases, nodes are executable in parallel, such as in cases where the nodes define input data that is already available and where none of the nodes define input data reliant on output data from another of the nodes.

In one or more embodiments, the DAG framework execution system 102 performs a data search within the content management system. Specifically, FIG. 2 shows the DAG framework execution system 102 determining a node path within the DAG 208 in response to the search request 204. Indeed, as shown, the DAG framework execution system 102 analyzes nodes of a DAG 208 that contains a plurality of nodes connected by edges (e.g., a node 212 and an edge 210) to determine a node path for executing operations corresponding to the search request 204. As used herein, the term "node path" refers to a sequence of nodes connected by edges that define a set of operations performed to generate a requested output for a search request. For example, a node path includes a path or a route that the DAG framework execution system 102 traverses from one node to another as part of a data search, executing some in parallel and others in series. In some embodiments, a node path includes no logic loops and instead always traverses forward without revisiting or returning to prior nodes (e.g., nodes already executed in the node path). Additionally, a node path can include nodes slated or scheduled for parallel execution and/or series execution.

Figure 3:
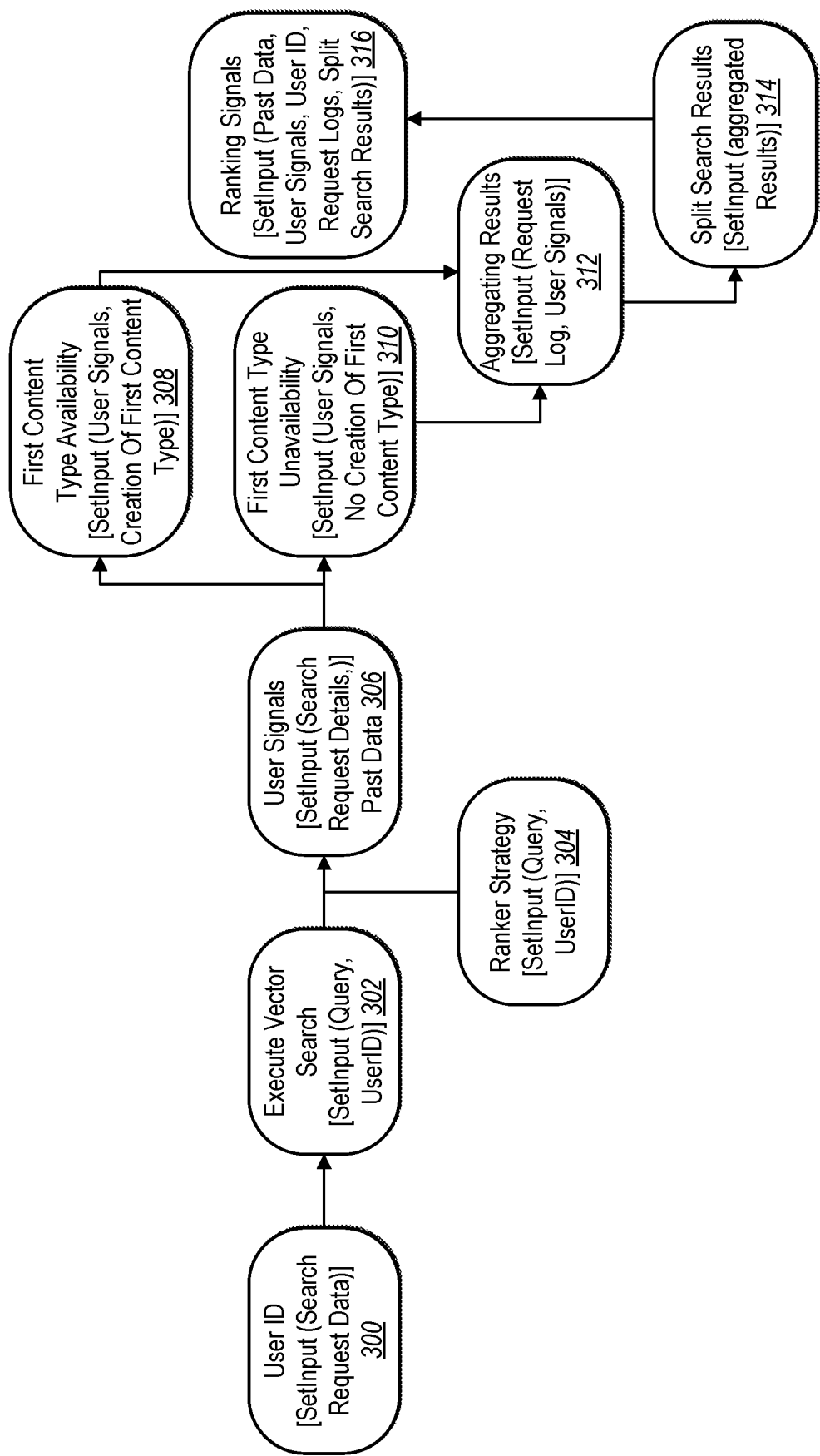
FIG. 3 illustrates an example diagram of the DAG framework execution system generating a DAG with multiple interconnected nodes that perform different computer operations in accordance with one or more embodiments.

As mentioned above, in certain embodiments, the DAG framework execution system 102 generates and/or provides a DAG. In particular, the DAG framework execution system 102 provides a preconstructed DAG developed (in Go) for fast execution of search engine functions through large-scale parallelization of node-specific operations. FIG. 3 illustrates an example diagram of at least a portion of a DAG in accordance with one or more embodiments.

As shown in FIG. 3, the DAG framework execution system 102 builds or provides a DAG that contains multiple nodes. As discussed, nodes of the DAG define respective computer operations, and in some cases, the computer operations include conditional statements (e.g., if/else statements) that indicate initialization or execution of the nodes. For instance, a downstream node of the DAG may be conditioned on the availability of specific input data generated as output from an upstream node. Thus, the downstream node does not begin to execute until the required input is received from the upstream node.

As mentioned, in one or more embodiments, the node includes computer code that defines a computer operation. For instance, a computer operation defined by a node can define one or more processes, methods, calls, or instructions executable by various devices and processors for performing specific tasks, such as authenticating a user, performing a vector search, performing an image search, ranking with a heuristic model, ranking with a machine learning model, identifying user signals, and/or identifying accessible folders. Indeed, the DAG framework execution system 102 defines node computer operations using computer code, such as computer code of the Go Programming Language. Such computer code can include a set of instructions written in a programming language that a computing device can interpret and execute to perform a specific task. The computer code can include a series of statements written in specific syntax and translatable into machine code to be executed by a computing device.

As mentioned, the DAG framework execution system 102 can use Go language computer code as the foundation of the DAG (e.g., to define the nodes in the DAG). For instance, the DAG framework execution system 102 uses Go routines (e.g., light weight thread concurrency primitives) to defined individual nodes, where each node can is made up of a single Go routine. Thus, upon execution of operations along a node path, the DAG framework execution system 102 executes a series of Go routines, passing generated data from node to node.

As shown in FIG. 3, the DAG can contain more than one node path, where each path includes upstream nodes and downstream nodes relative to one another. In one or more embodiments, "a downstream node" refers to a node in the DAG that is executed subsequent to another node. Specifically, a downstream node refers to nodes that come after prior node(s) in a data flow or information transmission and receive data (e.g., outputs) from the prior node(s). For example, for a DAG containing nodes A, B, C, and D, if node A generates output data and sends it to node B, then node B is a downstream node relative to node A. Further, if nodes C and D both require the output data from node B, then nodes C and D are downstream nodes relative to nodes A and B. In some embodiments, if nodes C and D are executable in parallel, then nodes C and D do not have a downstream-upstream relationship with each other.

Relatedly, the term "upstream node" refers to a node in the DAG that comes prior to another node. Specifically, an upstream node refers to a node that comes prior to additional nodes in a data flow or information transmission and sends output data to additional nodes. In the above example, (e.g., a DAG containing nodes A, B, C, and D), node A is an upstream node relative to nodes B, C, and D.

As illustrated, FIG. 3 shows an example of a DAG with multiple different computer operations along multiple potential node paths. For example, FIG. 3 shows an initial node 300 that generates an output ingested by a second node 302 and so on to a final node 316. In one or more embodiments, the tern "initial node" refers to a starting node of the node path. For example, the DAG framework execution system 102 determines the initial node for the node path based on initialization data included within the search request. Further, in some embodiments, the DAG framework execution system 102 initializes the node path with a single node to avoid execution errors (e.g., deadlocking). Specific examples of how the DAG framework execution system 102 determines the initial node is given below in the description of FIG. 4.

Further, FIG. 3 shows a name or title of the initial node 300 to describe its computer operation (e.g., "User ID"). For example, the computer operation of the initial node 300 includes authenticating a user account within the content management system 106. To execute the operation, the DAG framework execution system 102 verifies the identity of a user account of a computing device. For example, the DAG framework execution system 102 performs user authentication for a user of a client device that provides authentication credentials (e.g., a user identifier and a password). Moreover, the DAG framework execution system 102 runs different authentication protocols to validate the user as providing a valid identifier and password. Moreover, in some embodiments, once validated, the DAG framework execution system 102 can obtain user signals and other activity associated with the user account.

As shown in FIG. 3, the initial node 300 defines as input "search request data." For example, the initial node 300 receives as input the search request data which includes the received search request (e.g., the query) and information related to the computing device that submitted the search request (e.g., input such as a user identifier, a password, and an authentication token). Further, in some cases, the DAG framework execution system 102 generates output data utilizing the initial node 300 by executing the user authentication computer operation.

In one or more embodiments, the DAG framework execution system 102 generates the output data from the initial node 300 and passes the output data to a second node 302. For example, the second node 302 defines a computer operation of "execute vector search." In one or more embodiments, performing a vector search includes a process of finding similar content items in a content management system based on vector representations of the query and the content items. For instance, the DAG framework execution system 102 performs a vector search by generating vector encodings of a query and digital images and text documents in a content management system. Moreover, the DAG framework execution system 102 finds a similarity measurement between the query and the vector encodings of the content management system to identify one or more content items that most closely resemble the vector encoding of the query.

Additionally, as shown in FIG. 3, the second node 302 defines an input of "query and UserID." For instance, the second node 302 receives as input the query (e.g., the search request received by the DAG framework execution system 102) and the UserID. In other words, in some embodiments, the second node 302 begins to execute the computer operation of execute vector search in response to receiving the output data from the initial node 300. Moreover, the second node 302 also generates output data from executing the operation of execute vector search.

As shown in FIG. 3, the DAG contains a third node 304. For example, the third node 304 can run concurrently or in parallel with the second node 302. As shown, the third node 304 recites a computer operation of "ranker strategy." In one or more embodiments, performing a ranker strategy operation includes the DAG framework execution system 102 determining an order to present search results to a user based on relevance to a search request. For example, performing the ranker strategy operation can include identifying a relevance and keyword matching strategy, determining a content quality and originality strategy, identifying a page authority strategy, identifying a user experience strategy (how often do users select a specific result versus other results), identifying a file size of the content item (e.g., how fast the content item loads when selected), identifying an intent of the user, and identifying a security status (e.g., a content item with a secure or validated status).

As shown, the third node 304 recites an input of "query and UserID" Accordingly, after generating output data from the initial node 300, the DAG framework execution system 102 begins to execute the computer operations of the second node 302 and the third node 304 in parallel. In other words, the DAG framework execution system 102 concurrently progresses the execution of computer code for the second node 302 and the third node 304.

Moreover, in some embodiments, based on the parallel execution of the second node 302 and the third node 304, the DAG framework execution system 102 generates corresponding output data for the second node 302 and the third node 304. Further, as shown, the DAG framework execution system 102 passes the output data, for the second node 302 and the third node 304, to a fourth node 306 (e.g., where the fourth node 306 requires the output data as input). Additional details regarding parallelization is given below in the description of FIG. 4.

As shown, the fourth node 306 defines a computer operation of "user signals." In one or more embodiments, user signals include data that indicates recently selected content items (within the last hour, day, or week), recently shared files, recently created content items, recent search requests, and additional data (e.g., clicking on specific folders, viewing files, modifying files, and data that indicates past user activity). Furthermore, as shown, the fourth node 306 sets the input as "search request details and past data." For instance, the search request details include initialization data or requested output data of a search request (discussed in more detail below) that the DAG framework execution system 102 utilizes to determine one or more relevant user signals. Further, the past data includes historical activity performed by a computing device that submitted the search request.

As shown, the DAG includes a fifth node 308 that defines a computer operation of "first content type availability." As shown, the fifth node 308 requires input of user signals and the creation of a first content type. For example, the computer operation of a first content type availability includes an operation of the DAG framework execution system 102 determining from the user signals whether the computing device has created or stored a first content item type in the content management system.

In some instances, the fifth node 308 executes a computer operation to determine the presence or creation of a cloud document, an image file, a text file, an audio file, a video file, or a file created by a specific application (e.g., Dropbox Paper). Furthermore, in some embodiments, the DAG framework execution system 102 executes the operations of the fifth node 308 to check for the availability of a certain type of content to narrow a search to specific digital locations. Moreover, in some instances, different types of content and content created by different applications require different computer operations, thus the fifth node 308 helps expedite the process of narrowing down a search request.

Further, as shown, the DAG shows a sixth node 310 that defines a computer operation of "first content type unavailability." As shown, the sixth node 310 requires input of "user signals, and no creation of first content type." Specifically, the sixth node 310 receives as input the output data from the fourth node 306 (e.g., which includes an indication of the relevant user signals). Moreover, the sixth node 310 executes the computer operation of determining that the first content type is unavailable (e.g., no creation of or presence of the first content type in the content management system) and foregoes searching locations in the content management system that stores the first content type.

Moreover, as shown, the DAG includes a seventh node 312 that defines a computer operation of "aggregating results" based on an input of "request log, user signals." For example, aggregating results includes combining and organizing relevant information from multiple sources (e.g., multiple different folder locations, a cloud location, and a local location, etc.) to present a unified set of search results. Further, the computer operation of aggregating results further includes aggregating the top-ranked results from a search index and gathering information related to the results (e.g., snippets that include the title, the date of creation, the creator, etc.).

As mentioned, the input for the seventh node 312 includes the request log and user signals. For example, the request log refers to a data record of requests made to the DAG framework execution system 102 via the search engine. For instance, the request log further includes the actual queries, timestamps of the queries, IP addresses, information related to the computing devices submitting the queries, clicked results, and geographical/demographic information. Moreover, as shown, the seventh node 312 can receive input from the fifth node 308 or the sixth node 310.

As shown, the DAG includes an eighth node 314 that defines a computer operation of "split search results." For example, splitting search results includes determining to use machine learning models for ranking some of the results and using heuristic based models for ranking the remaining results. Further, as shown, the eighth node 314 requires as input the aggregated results. Thus, the eighth node 314 receives as input the output data from the seventh node 312.

As used herein, the term "machine learning model" includes or refers to a computer algorithm or a collection of computer algorithms that can be trained and/or tuned based on inputs to approximate unknown functions. For example, a machine learning model can include a computer algorithm with branches, weights, or parameters that changed based on training data to improve for a particular task. Thus, a machine learning model can utilize one or more learning techniques to improve in accuracy and/or effectiveness. Example machine learning models include various types of decision trees, support vector machines, Bayesian networks, random forest models, or neural networks (e.g., deep neural networks).

In one or more embodiments, the eighth node 314 includes computer code that calls a machine learning model to rank one or more search results by receiving one or more inputs. Specifically, the eighth node 314 can includes computer code that encodes features such as the output data from the aggregated results and additional output data (e.g., the user account information such as user signals). For example, the DAG framework execution system 102 weighs different feature encodings differently and generates output ranking predictions (e.g., based on the encoded features) to rank one or more of the results. To illustrate, for a search result that includes fifty content items, the DAG framework execution system 102 determines to utilize the machine learning model to rank the first ten content items.

Further, as shown, the DAG includes a final node 316. In one or more embodiments, a "final node" refers to an ending node of the node path. For example, the DAG framework execution system 102 determines the final node for the node path based on requested output data of the search request. In some embodiments, the final node includes a single node to avoid issues of deadlocking. As shown, the final node 316 requires as input the past data, user signals, user ID, and the request logs. In other words, the final node 316 receives as input the output data from the eighth node 314 and executes the operation of determining ranking signals.

Although FIG. 3 shows a specific set of computer operations, in one or more embodiments, the DAG includes a different ordering of operations, a different numbering of nodes, and nodes with different input requirements. Thus, FIG. 3 offers an illustrative example of a DAG that further shows series of nodes where some of the nodes can execute in parallel.

As mentioned above, in some embodiments, the DAG framework execution system 102 determines a node path of the DAG in response to a search request. For example, FIG. 4 illustrates an example diagram of the DAG framework execution system 102 determining and executing a node path to perform a data search of a content management system in accordance with one or more embodiments.

Figure 4:
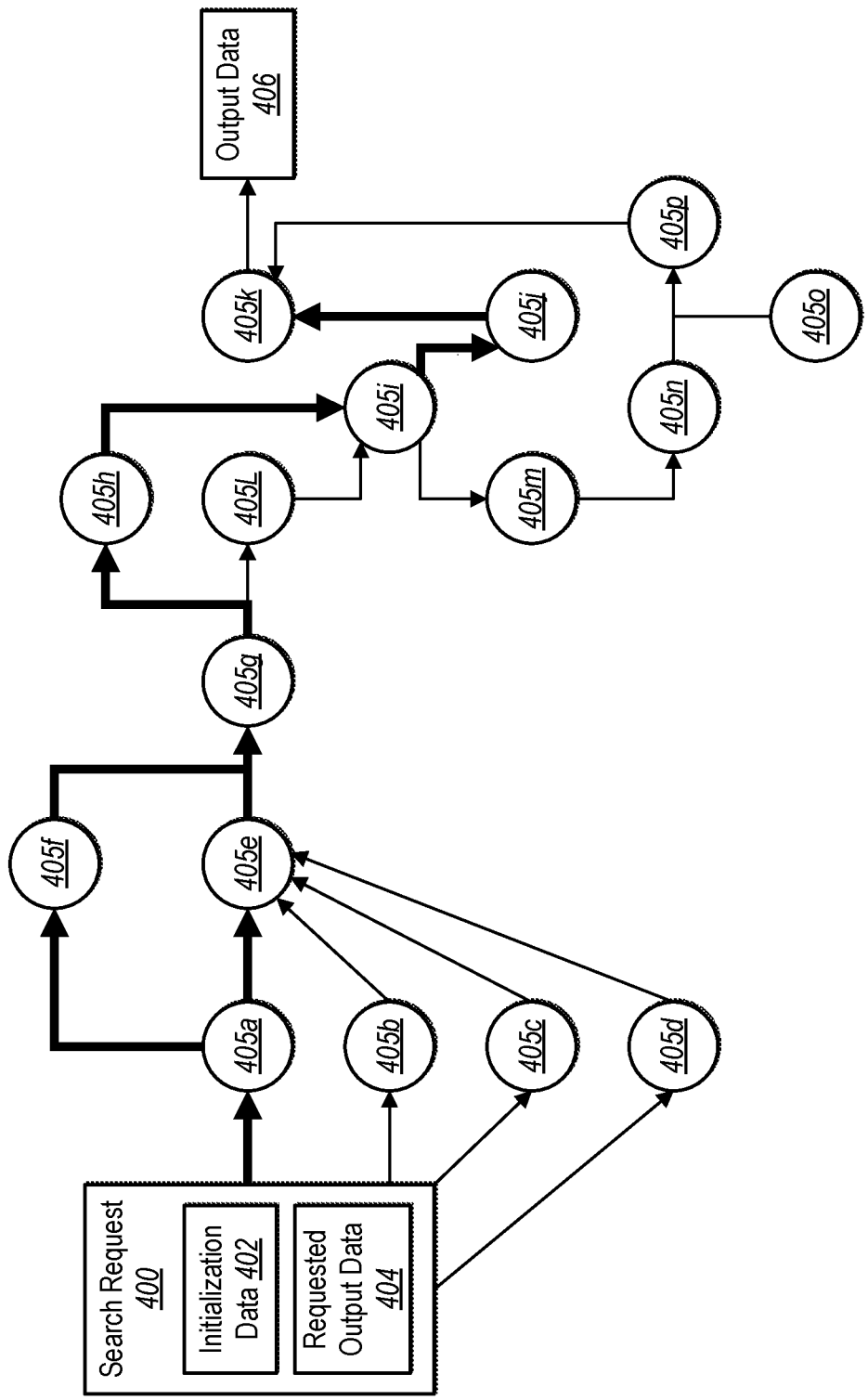
FIG. 4 illustrates an example diagram of the DAG framework execution system determining a node path responsive to a search request in accordance with one or more embodiments.

For example, FIG. 4 shows the DAG framework execution system 102 receiving a search request 400. As shown, the search request 400 includes initialization data 402 and requested output data 404. In one or more embodiments, "initialization data" refers to data provided by a computing device to the DAG framework execution system 102 to initialize execution of a node path in a DAG. For instance, the initialization data 402 includes query terms or keywords of the query and/or parameters or modifiers that refine the data search to retrieve specific types of results. Furthermore, in some embodiments, the initialization data 402 includes one or more content items and/or other information associated with the search request (e.g., user demographics, past historical search requests, time of day, geographic region, etc.). In response to receiving the initialization data 402, the DAG framework execution system 102 determines (on the fly) an initial node.

In one or more embodiments, "requested output data" refers to data requested or set as the ultimate product or result to be returned upon execution of a node path for a search request. For example, the requested output data 404 includes a list of files (e.g., documents, folders, images, videos, audio, etc.), web pages, types of applications, content items associated with various type of applications (e.g., cloud documents, Dropbox Paper documents, power point presentations, spreadsheets, etc.). Moreover, in some embodiments, the requested output data 404 includes a brief description extracted from the initialization data that points to a primary end point of retrieving data. Furthermore, in some embodiments, the requested output data 404 includes a total number of potential results, and additional sources to jump to different data points.

As shown, FIG. 4 illustrates a DAG with multiple nodes 405a-405p. For example, FIG. 4 shows the DAG contains multiple nodes as potential initial nodes (e.g., starting nodes) for respective node paths. However, for a determined node path, the DAG framework execution system 102 may only use a single initial node. As potential initial nodes, a node 405*a* represents a computer operation of "user authentication," a node 405*b* represents a computer operation of "search FAQs," a node 405*c* represents a computer operation of "search users," and node 405*d* represents "search recently accessed files."

As an example, the DAG framework execution system 102 receives the search request 400 in the form of a text query "image of cat in shared folder." In the search request 400, the initialization data 402 may be metadata that indicates a storage location of shared folders in the content management system and/or user account information requesting/sending the search request 400. In some embodiments, the DAG framework execution system 102 selects the node 405*a* as the initial node to authenticate the user (e.g., to determine which shared folders the user can access).

As another example, the DAG framework execution system 102 receives the search request 400 of "explain how to create a shared folder." In response, the DAG framework execution system 102 can determine the initial node as the node 405*b* (e.g., the FAQ node). Alternatively, if the DAG framework execution system 102 receives the search request 400 of "Daniel Smith," the DAG framework execution system 102 can determine the initial node as the node 405*c* (running a node to identify another user within the environment). If the DAG framework execution system 102 receives the search request 400 of "files in the last two hours," the DAG framework execution system 102 can determine the initial node as the node 405*d* (a node to find recently accessed content items).

In addition to determining an initial node for a node path, the DAG framework execution system 102 can also determine a final node or an output node. For example, based on the requested output data 404 (e.g., output data of an image file that originates from a shared folder), the DAG framework execution system 102 determines the node 405*k* as a final node. For instance, the DAG framework execution system 102 determines the final node (e.g., the node 405*k*) that includes a computer operation of ranking signals. In other words, the DAG framework execution system 102 determines that the requested output data 404 includes image file types from shared folders with a brief description showing the shared folder it originates from and the title of the image file. Although FIG. 4 shows a single final node, in one or more embodiments, the DAG contains multiple potential final nodes. In some instances, rather than using a ranking signal computer operation as the final node, the DAG framework execution system 102 utilizes a re-ranking computer operation (e.g., which involves obtaining ranking signals and then re-ranking based on additional data received from upstream nodes).

Moreover, as shown, based on the DAG framework execution system 102 determining the node 405*a* (e.g., the initial node) and the node 405*k* (e.g., the final node), the DAG framework execution system 102 further determines a node path from 405*a*-405*k*. Specifically, the node path includes 405*a*, 405*e*, 405*f*, 405*g*, 405*h*, 405*i*, 405*j*, and 405*k*.

As shown in FIG. 4, the node path includes the interconnected nodes along the bolded edges. Further, as shown, the node path further includes nodes executing in parallel (e.g., node 405*e* and the node 405*f*). Based on the search request 400, the DAG framework execution system 102 determines certain computer operations to parallelize, certain computer operations to run in series, and certain computer operations to omit. For instance, the DAG framework execution system 102 determines the initial node (e.g., the node 405*a*) and the final node (e.g., the node 405*k*), and further determines the shortest path (e.g., the fewest number of nodes or the fastest total execution time) that connect the initial node and the final node (e.g., while still being able to complete the search request).

For instance, for the search request 400 of "image of cat in shared folder," the DAG framework execution system 102 determines to parallelize executing an image search (e.g., the node 405*e*) and a ranking strategy (e.g., the node 405*f*). For example, the node 405*e* and the node 405*f* receive the output data from the node 405*a* as input. The DAG framework execution system 102 then concurrently executes the computer operations of the node 405*e* and the node 405*f*, in response to receiving the output data.

Further, in some embodiments, the DAG framework execution system 102 determines to run in series the user authentication (e.g., the node 405*a*) and then the image search (e.g., 405*e*) and the ranking strategy (e.g., 405*f*). Moreover, the DAG framework execution system 102 determines to omit the nodes 405*b*, 405*c*, and 405*d* because an initial node has already been selected and because they define input data not included as part of the initialization data 402. To reiterate, the DAG framework execution system 102 determines the initial and final node, determines a node path, and determines nodes that require the same input (e.g., to parallelize the nodes that require the same input from an upstream node).

In one or more embodiments, the DAG framework execution system 102 executes nodes based on processor/machine availability, speed of execution, and/or available data. Indeed, the DAG framework execution system 102 can execute various nodes in series, parallel, simultaneously, and/or at different times upon determining that their input data is available and that respective computing resources are able to perform the operations. For example, the DAG framework execution system 102 determines an order of operations for nodes based on the relative speed of executing the various nodes. For instance, if the DAG framework execution system 102 determines that a user authentication (e.g., to determine which folders a user can access) is relatively faster than performing an image search for cat images in a shared folder, and that user authentication credentials are required for additional downstream nodes, then the DAG framework execution system 102 first performs the user authentication to shorten the overall execution time. In some cases, the DAG framework execution system 102 may execute both operations in parallel on different virtual machines or server devices.

In one or more embodiments, the DAG framework execution system 102 determines that determining a certain subscription plan (e.g., a paying subscriber versus a non-paying subscriber) is slower than receiving an authentication token. In some instances, the DAG framework execution system 102 executes the operations of determining the subscription plan and the user authentication in parallel but begins by running the operation to receive the authentication token. Further, in some instances, when a lag in the data catches up, the DAG framework execution system 102 starts to concurrently progress the operations of receiving an authentication token and determining the subscription plan.

To further illustrate, in some embodiments, the search request 400 includes "show me images of dogs saved by Daniel Smith." In some embodiments, the DAG framework execution system 102 determines the following computer operations from fastest to slowest: 1) images saved by Daniel Smith 2) shared folders from Daniel Smith to a computing device 3) images of Dogs within the shared folders from Daniel Smith. In some embodiments, the DAG framework execution system 102 runs through nodes in the DAG from the fastest operations to the slowest operations. In some instances, if the relative speed of two or more operations is within a threshold amount of each other (e.g., 5 ms) and requires the same input, then the DAG framework execution system 102 runs the computer operations in parallel.

As shown in FIG. 4, the DAG framework execution system 102 utilizes the node path of the DAG to generate output data 406. In one or more embodiments, "output data" refers to information provided to a computing device in response to the search request. For example, the output data 406 includes a title, a snippet or summary, a uniform resource locator, metadata, and additional information related to properties of a content item. For instance, the DAG framework execution system 102 returns multiple content items as part of the output data 406 and provides an option for a computing device to select one or more of the content items.

Although FIG. 4 shows a single node path of the DAG, responsive to the search request 400, in one or more embodiments, the DAG framework execution system 102 receives an additional search request. For example, the DAG framework execution system 102 receives the additional search request with additional initialization data and additional requested output data. In response, the DAG framework execution system 102 determines an additional node path that includes nodes from the DAG with a different ordering of nodes than the node path shown in FIG. 4.

In some embodiments, the DAG framework execution system 102 implements machine learning models (e.g., neural networks) to predict a node path within the DAG. Specifically, the DAG framework execution system 102 utilizes machine learning models to determine predictions for node paths based on timing parameters (e.g., predicted execution times for candidate node paths) and predicted resource allocation for different node paths. For example, the DAG framework execution system 102 utilizes machine learning models trained on prior node path predictions (e.g., the cumulative time to execute each node in prior node path predictions and the number of resources consumed for each predicted node path) to determine node path predictions with the fastest execution times (e.g., relative to other node path prediction execution times) for specific search requests or to determine node path predictions that satisfy a threshold resource consumption.

In some instances, the DAG framework execution system 102 utilizes machine learning models that determine a node path prediction to jointly account for both the fastest execution times and the threshold resource consumption together. Specifically, the DAG framework execution system 102 processes the search request 400 that includes the initialization data 402 and the requested output data 404 to determine a node path that has both the fastest execution time and conserves the most resources.

In some embodiments, the DAG framework execution system 102 identifies historical data corresponding to a specific client device (e.g., as training data for training a machine-learning-based DAG prediction model). Specifically, the DAG framework execution system 102 utilizes the historical data to identify common node paths (in one or more DAGs) based on search activity or other actions of the specific client device. For example, a specific client device commonly i) submits requests to access a specific set of shared folders, ii) utilizes a specific application (e.g., Dropbox Paper), and iii) submits requests to search for a specific folder. In such instances, the DAG framework execution system 102 can determine to perform the operations in the order of ii), iii), and i). In other words, the DAG framework execution system 102 identifies commonly performed actions and determines the order to execute the actions to maximize resource conservation and minimize execution times.

As mentioned above, the DAG framework execution system 102 improves latency/speed of executing operations relative to prior systems. Experimenters have demonstrated that the DAG framework execution system significantly improves the speed of generating search results by executing data searches. For example, some experimenters indicated that the $95^{th}$ percentile latency of data searches is 650 ms in prior systems. By comparison, experiments showed that the DAG framework execution system 102 reduced the latency by about in 250 ms at the $95^{th}$ percentile. Even more drastic, experimenters also demonstrated a latency improvement of about 1.3 seconds at the $99^{th}$ latency percentile, as compared to prior systems.

Moreover, although FIGS. 3 and 4 show a set number of nodes and node paths, in one or more embodiments, the DAG framework execution system 102 generates a DAG with hundreds or thousands of nodes that execute hundreds of operations in parallel. Furthermore, in some embodiments, the DAG framework execution system 102 generates a DAG with only a couple of nodes. In other words, the complexity of the DAG can range from very simple to very complex to support various types of computing environments.

Figure 5:
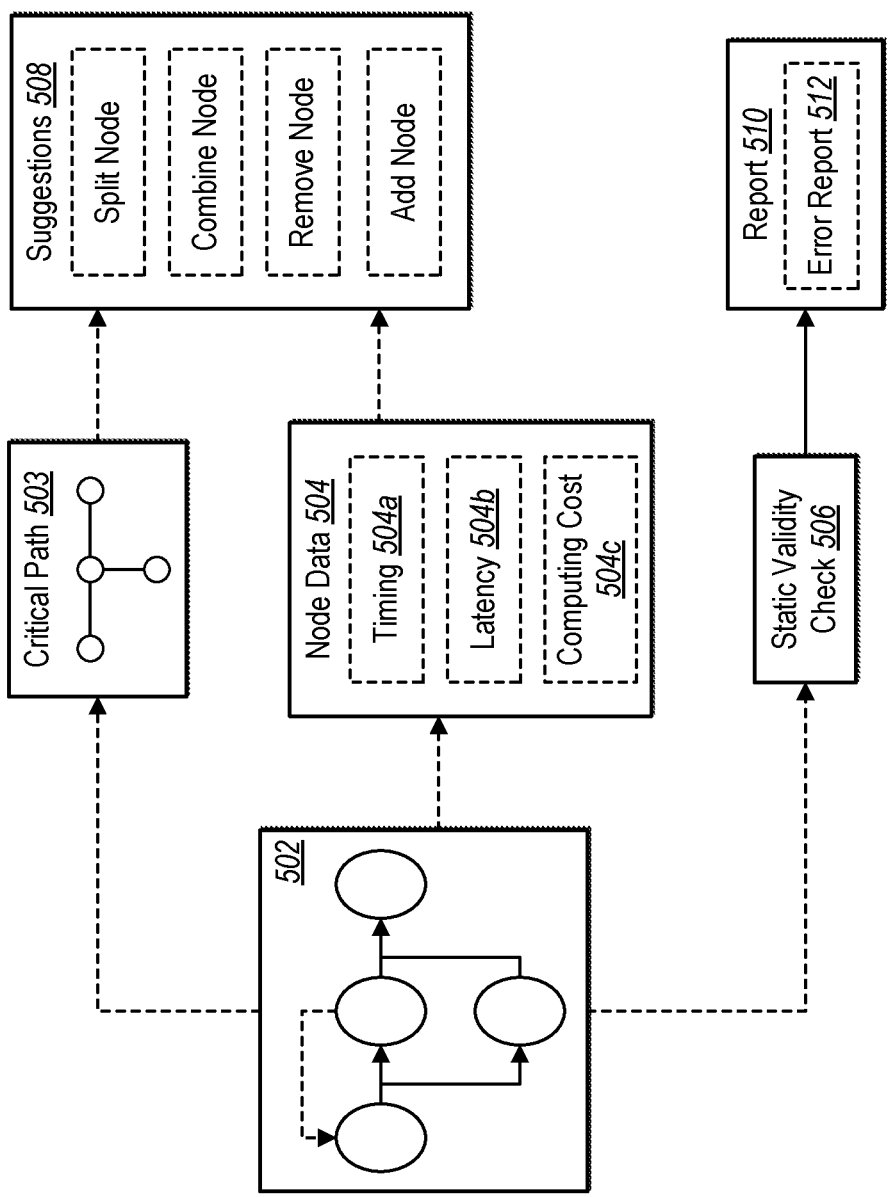
FIG. 5 illustrates an example diagram of the DAG framework execution system providing developer tools in accordance with one or more embodiments.

As mentioned above, the DAG framework execution system 102 provides developer tools. In particular, the DAG framework execution system 102 provides developer tools in the form of timing and performance metrics and functionality for modifying nodes in a DAG to improve latency and performance. FIG. 5 illustrates an example diagram of generating and providing developer tools in accordance with one or more embodiments.

In one or more embodiments, a DAG is "acyclic" in that it is loopless. Specifically, the DAG framework execution system 102 builds or receives a DAG that is loopless such that no node of the DAG logically loops back to an upstream node (e.g., a previous node). For example, each node of the DAG receives input data and generates independent output data from the input data. For instance, the transmission of data through the DAG progresses from upstream nodes to downstream nodes without looping back to upstream nodes.

As just described, the DAG is loopless. However, in some embodiments, some data generated by downstream nodes are still passable to upstream nodes. Specifically, FIG. 5 shows a DAG 502 with interconnected nodes and also shows a dotted arrow going from a downstream node to an upstream node. For instance, the dotted arrow does not indicate a loop in the DAG but indicates streaming features of the DAG 502. In one or more embodiments, the streaming features include a Boolean operation of a downstream node requesting an upstream node to send additional data. For example, the streaming features include a continuous flow of data as the data becomes available. In other words, the dotted arrow going from a downstream node to an upstream node indicates a downstream node telling an upstream node to continue sending data as the data becomes available. In some instances, the dotted arrow indicates a downstream node to not send any additional data, even if the data becomes available.

To illustrate, for the search request "a cat image from a shared folder," the upstream node can contain computer operations to identify all the shared folders, while a downstream node can contain computer operations to identify cat images within the shared folders. In some embodiments, as the upstream node identifies a shared folder, the downstream node begins to identify cat images within the shared folder. Moreover, in some embodiments, the downstream node continues to ping the upstream node with Boolean data to continue sending additional shared folders. For instance, once the downstream node identifies five cat images from shared folders, the downstream node can send Boolean data to indicate to the upstream node to stop sending additional shared folders.

As shown in FIG. 5, the DAG framework execution system 102 determines a critical path 503. In one or more embodiments, a "critical path" refers to a sequence of nodes and edges (e.g., a specific node path) that has a longest or slowest execution time from among possible node paths. In other words, the critical path includes the longest path to complete a search operation. In some embodiments, the nodes in the critical path 503 contribute to the total latency (e.g., delay) experienced by data packets traversing the node path. As shown, the DAG framework execution system 102 determines the critical path 503 and further generates a notification related to the critical path 503. In other words, a single DAG can contain aa single critical path that contains the longest possible path to traverse the DAG.

As shown in FIG. 5, the DAG framework execution system 102 further determines node data 504 from the DAG 502. For example, the node data 504 includes statistics related to running computer operations of each node. For instance, the node data 504 includes timing 504a, latency 504b, and computing cost 504c. In one or more embodiments, the "timing" refers to an amount of time needed for a task or operation as represented by a node to be completed. For example, the timing 504a includes the DAG framework execution system 102 executing defined computer code for a node and determining an amount of time needed to execute the node (e.g., a user authentication node takes 20 milliseconds while a search vector node takes 45 milliseconds).

In one or more embodiments, "latency" refers to an overall execution time or an elapsed time from receiving a search request to generating a search result. For example, the latency can include a user query latency, a network latency, a content delivery latency, and a mobile device latency. For instance, the final node can take 20 ms to execute, however there can be a delay of another 20 ms for the DAG framework execution system 102 to actually provide the results generated by executing the final node. Moreover, in some instances, the latency includes the total time between a computing device submitting a search request and the DAG framework execution system 102 returning the search results. In other words, the latency time includes both micro (e.g., on a node level) and macro (e.g., the DAG as a whole).

In one or more embodiments, "computing cost" refers to metrics and measurements associated with expenses incurred in operating and maintaining one or more nodes of the DAG. For instance, the computing cost 504c includes infrastructure costs (e.g., the cost involved with using a certain node in the node path), cloud cost (e.g., computing costs incurred based on resource usage in a cloud space when running a node versus not running a node), processing cost (e.g., cost of using a specific ranking algorithm), and scaling costs (e.g., costs to scale the DAG to increased traffic).

As shown in FIG. 5, from the critical path 503 and/or the node data 504, the DAG framework execution system 102 generates suggestions 508 (e.g., notifications to provide to one or more developers). For example, the DAG framework execution system 102 determines the critical path 503 took a certain amount of time (e.g., 700 ms as an average time to traverse the critical path 503) and provides a variety of suggestions to improve the critical path 503. In one or more embodiments, the DAG framework execution system 102 generates a suggestion to split one or more nodes within the DAG. For example, the DAG framework execution system 102 splits a node by identifying a node that performs multiple operations or sub-operations that are capable of operating independently.

In one or more embodiments, the DAG framework execution system 102 generates a suggestion to combine one or more nodes of the DAG. For example, combining one or more nodes refers to the nodes in the DAG capable of being combined into a single node. For instance, combining nodes refers to the nodes performing operations that are capable of being performed simultaneously and concurrently under an umbrella of defined computer code. Accordingly, combining nodes includes having multiple operations or sub-operations being performed within the same node. In some instances, combining multiple nodes includes the DAG framework execution system 102 re-defining the computer code to include the multiple operations or sub-operations.

In one or more embodiments, the DAG framework execution system 102 generates a suggestion to remove a node or add a node. For example, the DAG framework execution system 102 generates a suggestion to remove a node when a node seems to be uncommon in a critical path, and the computer operations of the node can further be replaced by an already existing node. In some embodiments, the DAG framework execution system 102 generates a suggestion to add a node in response to issues such as a logic bug.

Furthermore, FIG. 5 shows the DAG framework execution system 102 performing a static validity check 506. For instance, the DAG framework execution system 102 performs a type check of the computer code in the DAG. For example, in computer programing (e.g., object-oriented programming) a "type" includes a description (in a programming language) of a set of values, operations, or building blocks for organizing and modeling data in a software system. In particular, a defined type can include a coded expression defining the structure and behavior of objects of a specifically defined type. For instance, a type can include attributes (e.g., for a file system operations type, an attribute can include file location, file type, etc.) and functions (e.g., user authentication, determining user signals, or sharing a folder) of code expressions.

In one or more embodiments, the DAG framework execution system 102 performs the static validity check 506 prior to executing the operations of a node path. For example, the static validity check includes validating defined computer code without actually executing the computer code. For instance, the DAG framework execution system 102 performs the static validity check 506 by analyzing the computer code to identify bugs or other issues (e.g., computer syntax, security vulnerabilities, compliance with a predefined field specification, etc.).

In one or more embodiments, the DAG framework execution system 102 performs built in error handling. To elaborate, if a node within a DAG fails or returns an error, the DAG framework execution system 102 does not crash the entire data search but instead propagates the error through the nodes to retain the error (for later debugging) without crashing the program. Indeed, the DAG framework execution system 102 can thus provide trackable or traceable errors much more readily than prior systems by indicating the node where the error first appeared. The built in error handling includes mechanisms thus clearly indicate which nodes cause errors by propagating the errors through a node path to show where they first appear. In some cases, the DAG framework execution system 102 shuts down failed sections of the graph that produce errors (e.g., either identified during the static validity check 506 or during execution time).

Moreover, FIG. 5 shows the DAG framework execution system 102 generating a report 510. In some embodiments, the report 510 further includes an error report 512 that highlights the statically type checked errors (e.g., incorrectly typed attribute types or functions). Further, in some embodiments, the DAG framework execution system 102 provides the report 510 to one or more developer device.

Figure 6:
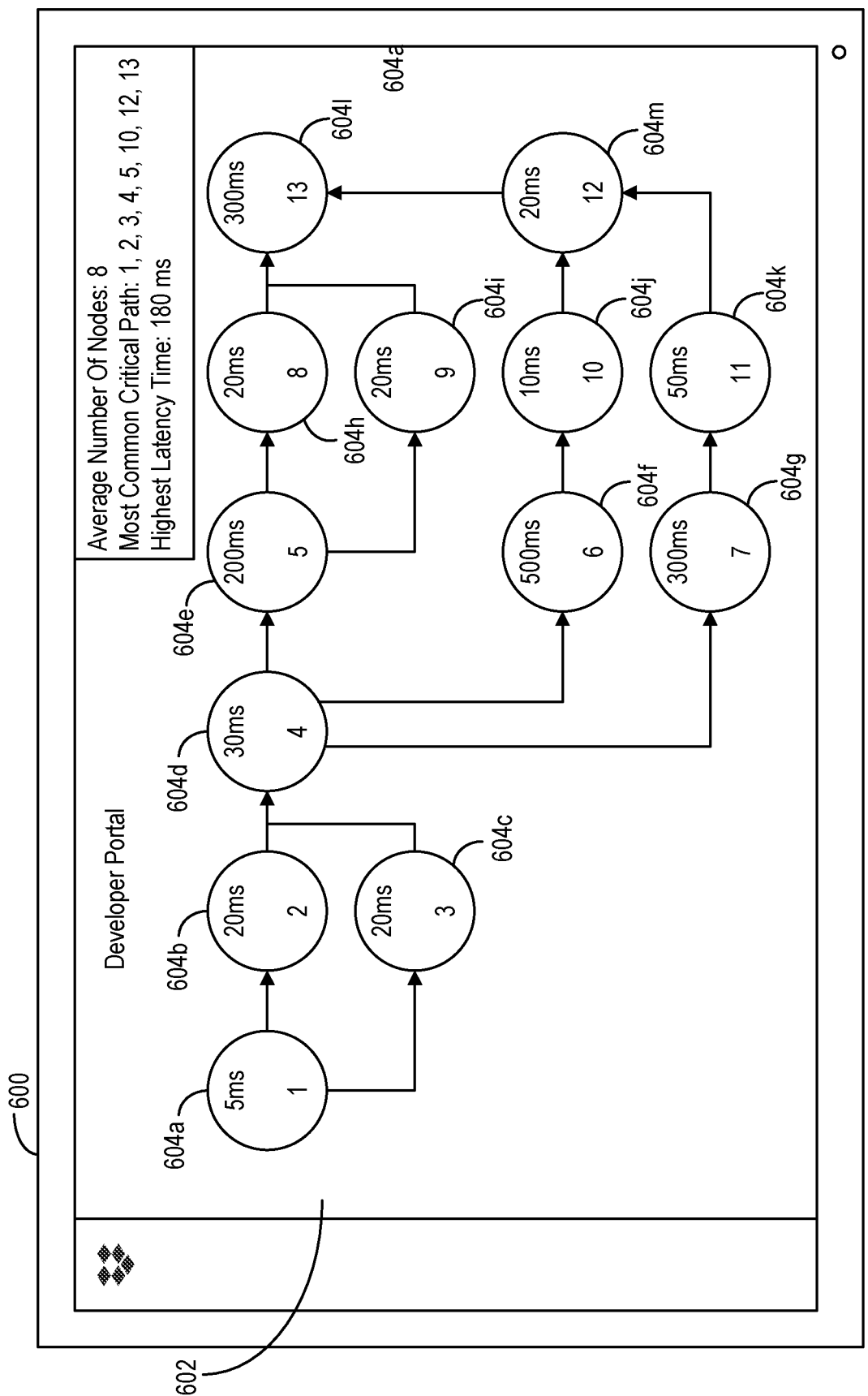
FIG. 6 illustrates an example graphical user interface of a developer portal that the DAG framework execution system provides to one or more computing devices in accordance with one or more embodiments.

FIG. 6 illustrates an example graphical user interface of a developer portal that the DAG framework execution system 102 provides to one or more developer device in accordance with one or more embodiments. For example, FIG. 6 shows a graphical user interface 602 of a computing device 600, where the graphical user interface 602 displays a DAG with a plurality of nodes 604a-604m. The graphical user interface 602 also includes developer metrics, such as execution times, critical path information.

As shown in FIG. 6, the nodes 604a-604m each indicate their own respective execution times. In some embodiments, the DAG framework execution system 102 determines the execution time for the nodes 604a-604m by timing the node at the time of receiving an input to the time of completing the execution of a node. To illustrate, FIG. 6 shows that the node 604e, 604f, and 604g each take 200 ms, 500 ms, and 300 ms, respectively. In some instances, the execution time of these nodes could indicate to a developer to split one or more of the nodes. Further, as shown in FIG. 6, the DAG framework execution system 102 provides additional developer statistics such as an average number of nodes (e.g., utilized for a search request), the most common critical path (1, 2, 3, 4, 5, 10, 12, and 13), and the highest recorded latency time (e.g., 180 ms from the time of submitting a search request and the DAG framework execution system 102 beginning to process the search request). Alternatively, the recorded latency time could encompass the total time for executing each node of a critical path, or latency times for individual nodes.

In one or more embodiments, the DAG framework execution system 102 provides statistics of the critical path by running multiple search operations or tests on the DAG (or by monitoring DAG performance for search requests over time). Specifically, the DAG framework execution system 102 monitors the performance of the DAG over a number of search requests and returns critical path information based on timing for executing each of the data searches. For example, the DAG framework execution system 102 determines one or more critical paths by identifying fluctuations in timing as nodes are processed for each request. In some cases, the DAG can have multiple critical paths, one for each search request. The DAG framework execution system 102 can further determine a most common critical path for a DAG (e.g., a node path that takes the longest time to execute more often than other node paths), a highest latency of a critical path, and/or an average execution time of critical paths.

In one or more embodiments, the DAG framework execution system 102 could provide suggestions or indications of one or more nodes that are parallelizable. In some cases, the DAG framework execution system 102 could determine that the node 604j and the node 604k are parallelizable. For example, because the DAG framework execution system 102 runs the node 604j and the node 604k in parallel, the DAG framework execution system 102 further determines that the node 604j and the node 604k are sub-operations that can be run within the same node (e.g., based on running a plurality of sample search requests).

In one or more embodiments, the graphical user interface 602 that shows the DAG further allows for user interactions with each node. For example, a user interaction selecting the node 604e causes the graphical user interface 602 to display the computer code that defines the node 604e, the number of times the node 604e has run, and additional statistics (e.g., latency, bugs, etc.). Moreover, in some embodiments, the DAG framework execution system 102 provides in the graphical user interface 602 the ability for a developer to merge, split, add, or remove one or more nodes form the DAG. For instance, the user interaction to merge can include dragging and dropping one or more nodes in the DAG into another node in the DAG. Moreover, the user interaction to split, add or remove can include selecting (e.g., clicking) one or more of the nodes and selecting an option to split, add or remove.

In some embodiments, the DAG framework execution system 102 further implements machine learning predictive tools (e.g., neural networks) to generate recommendations to provide to the developer portal. Specifically, the DAG framework execution system 102 utilizes machine learning models trained on multiple DAGs and prior node path data for the multiple DAGs. For example, the DAG framework execution system 102 utilizes machine learning models trained on node paths with certain computer operations combined within a single node, certain computer operations split into multiple nodes, or certain node paths lacking certain computer operations. Accordingly, the DAG framework execution system 102 utilizes the machine learning models trained in such a manner to generate predictions regarding splitting, combining, removing, or adding a node based on the statistics collected for a specific DAG.

Figure 7:
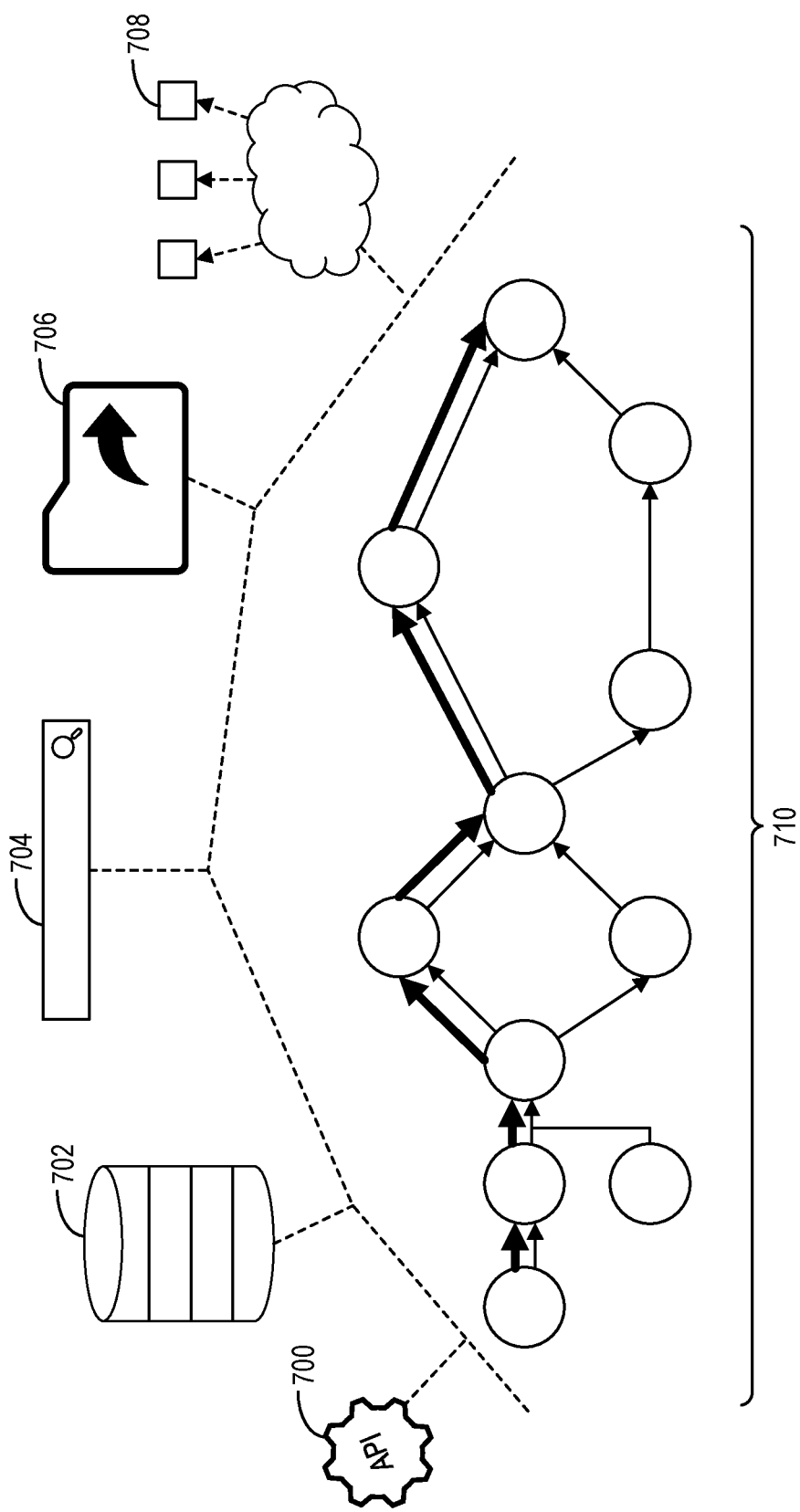
FIG. 7 illustrates an example diagram of the DAG framework execution system supporting a number of different computing environments in accordance with one or more embodiments.

As mentioned above, the DAG framework execution system 102 supports a variety of different computing environments. In particular, the DAG framework execution system 102 can generate, provide, and execute DAGs within computing environments of various systems that utilize search engine functionality. FIG. 7 illustrates a diagram of multiple different computing environments (e.g., with different functions) compatible with a DAG in accordance with one or more embodiments.

For example, FIG. 7 shows a DAG 710 with interconnected nodes. Further, the DAG framework execution system 102 utilizes the framework of the DAG (e.g., statically typed language, defined operations that defined required inputs, predetermined initial nodes and final nodes) to act as the backbone for a variety of systems.

For example, FIG. 7 shows the DAG framework execution system 102 utilizing the DAG 710 to support a backend component such as an application programming interface 700 (API). For instance, an API includes a set of protocols, tools, and definitions that allow different software applications to communicate with one another. Further the API defines the methods and data formats that applications can use to request and exchange information. To illustrate, a software application can utilize the DAG 710 to execute multiple operations (divided into different nodes) to send communication data to another software application. Moreover, the software application can parallelize one or more of the API calls utilizing the DAG 710.

Further, FIG. 7 shows the DAG framework execution system 102 supporting a database 702. For example, the database 702 includes a Structured Query Language (SQL) database, that involves the complex defining and manipulation of data. For instance, the DAG 710 can support the database 702 in retrieving information in response to complex queries by dividing a set of operations to different nodes of the DAG and running some of those operations in parallel.

Moreover, FIG. 7 shows the DAG framework execution system 102 supporting a search engine 704. As is described in detail above, the DAG framework execution system 102 supports the search engine 704 by receiving a search request and executing a number of operations to return output data responsive to the search request (e.g., and also executing operations in parallel and in series).

Further, FIG. 7 shows the DAG framework execution system 102 supporting shared folders 706. For example, in some instances a computing device shares a folder with another computing device and the folder contains many content items. In performing such an operation, the shared folders 706 can leverage the DAG 710 to break up multiple operations to different nodes and parallelize some of the operations.

Moreover, FIG. 7 shows the DAG framework execution system 102 supporting communication between multiple networking devices 708. Similar to the API, the DAG framework execution system 102 can port the operations involved with communication between multiple networking devices 708 to the DAG framework. In doing so, the DAG framework execution system 102 determines to parallelize some of the operations which increases the efficiency and accuracy in which the multiple networking devices 708 communicate with one another.

Figure 8:
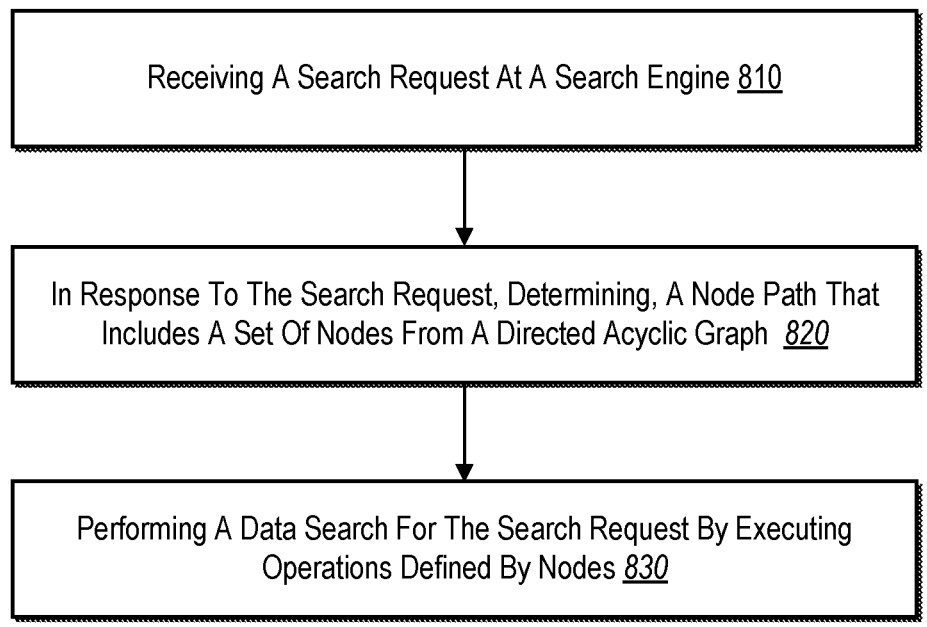
FIG. 8 illustrates an example series of acts performed by the DAG framework execution system in accordance with one or more embodiments.

While FIG. 8 illustrates acts according to certain implementations, alternative implementations may omit, add to, reorder, and/or modify any of the acts shown in FIG. 8. The acts of FIG. 8 can be performed as part of a method. Alternatively, a non-transitory computer-readable medium can comprise instructions, that when executed by one or more processors, cause a computing device to perform the acts of FIG. 8. In still further implementations, a system can perform the acts of FIG. 8.

As illustrated in FIG. 8, a series of acts 800 may include an act 810 receiving a search request at a search engine, an act 820 of in response to the search request, determining, a node path that includes a set of nodes from a directed acyclic graph, and an act 830 of performing a data search for the search request by executing operations defined by nodes.

In particular the act 810 includes receiving a search request at a search engine of a content management system. Further, the act 820 includes in response to the search request, determining, within a directed acyclic graph comprising a plurality of nodes defining computer operations for performing data searches within the content management system, a node path comprising a set of nodes from the directed acyclic graph corresponding to the search request. Moreover, the act 830 includes performing a data search for the search request by executing operations defined by nodes along the node path within the directed acyclic graph.

Further, in one or more embodiments, the series of acts 800 includes receiving, from a client device, an indication of a user interaction requesting a digital content search for a search query. Additionally, in one or more embodiments, the series of acts 800 includes receiving, from a networking device in communication with the content management system, network data requesting performance of a search function by the search engine of the content management system. Moreover, in one or more embodiments, the series of acts 800 includes the directed acyclic graph comprises interconnected nodes defined by computer code, wherein one or more of the interconnected nodes is executable in parallel. Further, in some embodiments, the series of acts 800 includes the directed acyclic graph comprises no loops between a downstream node and a previous upstream node.

Furthermore, in one or more embodiments, the series of acts 800 includes determining operations of two more nodes within the directed acyclic graph to execute in parallel for the search request. Additionally, in one or more embodiments, the series of acts 800 includes determining operations of at least one node within the directed acyclic graph to execute in series separately from the two or more nodes within the directed acyclic graph. Moreover, in one or more embodiments, the series of acts 800 includes determining an initial node based on initialization data included accompanying the search request. Further, in one or more embodiments, the series of acts 800 includes determining a final node based on requested output data indicated by the search request.

Further, in one or more embodiments, the series of acts 800 includes concurrently executing operations of two or more nodes compatible with parallel execution together. Moreover, in one or more embodiments, the series of acts 800 includes generating node data by executing an operation for a node along the node path. Additionally, in one or more embodiments, the series of acts 800 includes passing the node data to one or more additional nodes along the node path, wherein the one or more additional nodes define the node data as input. Moreover, in one or more embodiments, the series of acts 800 includes determining, based on the search request, one or more nodes within the directed acyclic graph to omit from the node path.

Moreover, in one or more embodiments, the series of acts 800 includes receiving a search request at a search engine of a content management system. Further, in one or more embodiments, the series of acts 800 includes in response to the search request, determining, within a directed acyclic graph comprising a plurality of nodes defining computer operations for performing data searches within the content management system, a node path comprising a set of nodes from the directed acyclic graph corresponding to the search request. Moreover, in one or more embodiments, the series of acts 800 includes determine two or more nodes of the set of nodes to execute in parallel. Further, in one or more embodiments, the series of acts 800 includes performing a data search for the search request by executing operations defined by the two or more nodes along the node path within the directed acyclic graph.

Further, in one or more embodiments the series of acts 800 includes receiving an additional search request at the search engine of the content management system. Further, in one or more embodiments, the series of acts 800 includes in response to the additional search request, determining an additional node path, the additional node path comprising nodes from the directed acyclic graph with a different ordering of nodes than the node path as indicated by the additional search request.

Furthermore, in one or more embodiments the series of acts 800 includes determining a critical path of the directed acyclic graph. Moreover, in one or more embodiments, the series of acts 800 includes based on the critical path, generating a notification comprising a suggestion to split one or more nodes along the node path for decreasing a time to execute operations defined by the one or more nodes. Further, in one or more embodiments, the series of acts 800 includes determining an execution time for performing an operation for a node along the node path. Moreover, in one or more embodiments, the series of acts 800 includes generating a suggestion to modify the node along the node path based on the execution time.

Moreover, in one or more embodiments, the series of acts 800 includes perform a static validity check of the directed acyclic graph prior to executing the operations. Further, in one or more embodiments the series of acts 800 includes determining an initial node based on initialization data included accompanying the search request. Further, in one or more embodiments, the series of acts 800 includes determining a final node based on requested output data indicated by the search request. Moreover, in one or more embodiments, the series of acts 800 includes determining two or more nodes within the directed acyclic graph to execute in parallel between the initial node and the final node.

Moreover, in one or more embodiments the series of acts 800 includes receiving a search request at a search engine of a content management system. Further, in one or more embodiments, the series of acts 800 includes in response to the search request, determining, within a directed acyclic graph comprising a plurality of nodes defining computer operations for performing data searches within the content management system, a node path comprising a set of nodes from the directed acyclic graph corresponding to the search request. Further, in one or more embodiments, the series of acts 800 includes performing a data search for the search request by executing operations defined by nodes along the node path within the directed acyclic graph. Further, in one or more embodiments, the series of acts 800 includes providing result data from the data search to a computing device that initiates the search request.

Furthermore, in one or more embodiments the series of acts 800 includes receiving, from the computing device, an indication of a user interaction inputting one or more text characters to request a digital content item from the content management system. Moreover, in one or more embodiments, the series of acts 800 includes performing the data search by concurrently executing operations of two or more nodes of the plurality of nodes within the directed acyclic graph that are compatible with parallel execution together. Further, in one or more embodiments, the series of acts 800 includes determining, based on the search request, one or more nodes within the directed acyclic graph to omit from the node path. Moreover, in one or more embodiments, the series of acts 800 includes determine operations of two more nodes within the directed acyclic graph to execute in parallel for the search request. Moreover, in one or more embodiments, the series of acts 800 includes determining operations of at least one node within the directed acyclic graph to execute in series separately from the two or more nodes within the directed acyclic graph.

Moreover, in one or more embodiments, the series of acts 800 includes generating node data by executing an operation for a node along the node path. Further, in one or more embodiments, the series of acts 800 includes passing the node data to multiple nodes along the node path, wherein the multiple nodes execute operations in parallel and define the node data as input.

Further, in one or more embodiments, the series of acts 800 includes executing a first node of the node path that authenticates a user account of a client device in parallel with a second node of the node path that obtains user signals of the client device. Moreover, in one or more embodiments the series of acts 800 includes after executing the first node and the second node in parallel, executing a third node of the node path that determines shared files accessible by the user account.

The components of the DAG framework execution system 102 can include software, hardware, or both. For example, the components of the DAG framework execution system 102 can include one or more instructions stored on a computer-readable storage medium and executable by processors of one or more computing devices. When executed by one or more processors, the computer-executable instructions of the DAG framework execution system 102 can cause a computing device to perform the methods described herein. Alternatively, the components of the DAG framework execution system 102can comprise hardware, such as a special purpose processing device to perform a certain function or group of functions. Additionally or alternatively, the components of the DAG framework execution system 102can include a combination of computer-executable instructions and hardware.

Furthermore, the components of the DAG framework execution system 102performing the functions described herein may, for example, be implemented as part of a stand-alone application, as a module of an application, as a plug-in for applications including content management applications, as a library function or functions that may be called by other applications, and/or as a cloud-computing model. Thus, the components of the DAG framework execution system 102may be implemented as part of a stand-alone application on a personal computing device or a mobile device.

Embodiments of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
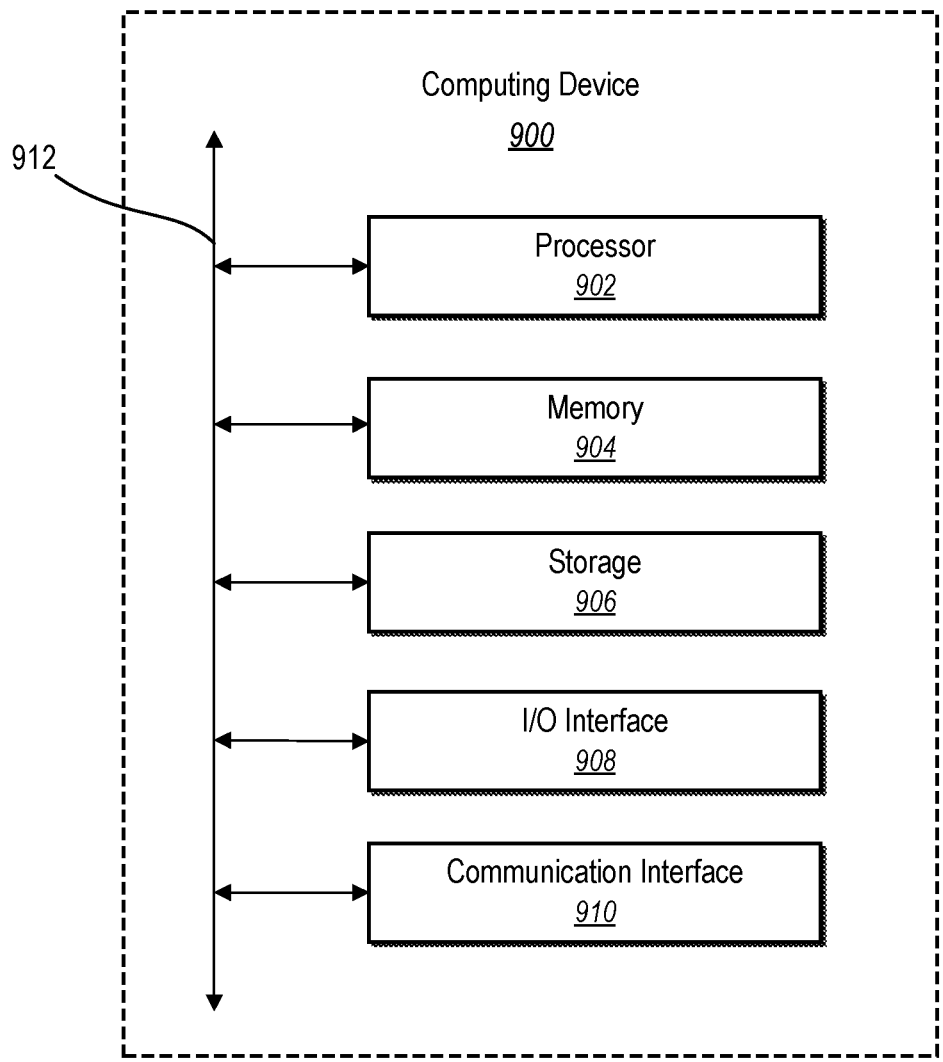
FIG. 9 illustrates a block diagram of an exemplary computing device in accordance with one or more embodiments.

FIG. 9 illustrates a block diagram of exemplary computing device 900 (e.g., the server(s) 104 and/or the client device 108) that may be configured to perform one or more of the processes described above. One will appreciate that server(s) 104 and/or the client device 108 may comprise one or more computing devices such as computing device 900. As shown by FIG. 9, computing device 900 can comprise processor 902, memory 904, storage device 906, I/O interface 908, and communication interface 910, which may be communicatively coupled by way of communication infrastructure 912. While an exemplary computing device 900 is shown in FIG. 9, the components illustrated in FIG. 9 are not intended to be limiting. Additional or alternative components may be used in other implementations. Furthermore, in certain implementations, computing device 900 can include fewer components than those shown in FIG. 9. Components of computing device 900 shown in FIG. 9 will now be described in additional detail.

In particular implementations, processor 902 includes hardware for executing instructions, such as those making up a computer program. As an example and not by way of limitation, to execute instructions, processor 902 may retrieve (or fetch) the instructions from an internal register, an internal cache, memory 904, or storage device 906 and decode and execute them. In particular implementations, processor 902 may include one or more internal caches for data, instructions, or addresses. As an example and not by way of limitation, processor 902 may include one or more instruction caches, one or more data caches, and one or more translation lookaside buffers (TLBs). Instructions in the instruction caches may be copies of instructions in memory 904 or storage device 906.

Memory 904 may be used for storing data, metadata, and programs for execution by the processor(s). Memory 904 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 904 may be internal or distributed memory.

Storage device 906 includes storage for storing data or instructions. As an example and not by way of limitation, storage device 906 can comprise a non-transitory storage medium described above. Storage device 906 may include a hard disk drive (HDD), a floppy disk drive, flash memory, an optical disc, a magneto-optical disc, magnetic tape, or a Universal Serial Bus (USB) drive or a combination of two or more of these. Storage device 906 may include removable or non-removable (or fixed) media, where appropriate. Storage device 906 may be internal or external to computing device 900. In particular implementations, storage device 906 is non-volatile, solid-state memory. In other implementations, Storage device 906 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 908 allows a user to provide input to, receive output from, and otherwise transfer data to and receive data from computing device 900. I/O interface 908 may include a mouse, a keypad or a keyboard, a touch screen, a camera, an optical scanner, network interface, modem, other known I/O devices or a combination of such I/O interfaces. I/O interface 908 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 908 is configured to provide graphical data to a display for presentation to a user. The graphical data may be representative of one or more graphical user interfaces and/or any other graphical content as may serve a particular implementation.

Communication interface 910 can include hardware, software, or both. In any event, communication interface 910 can provide one or more interfaces for communication (such as, for example, packet-based communication) between computing device 900 and one or more other computing devices or networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 910 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 910 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 910 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 912 may include hardware, software, or both that couples components of computing device 900 to each other. As an example and not by way of limitation, communication infrastructure 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 10:
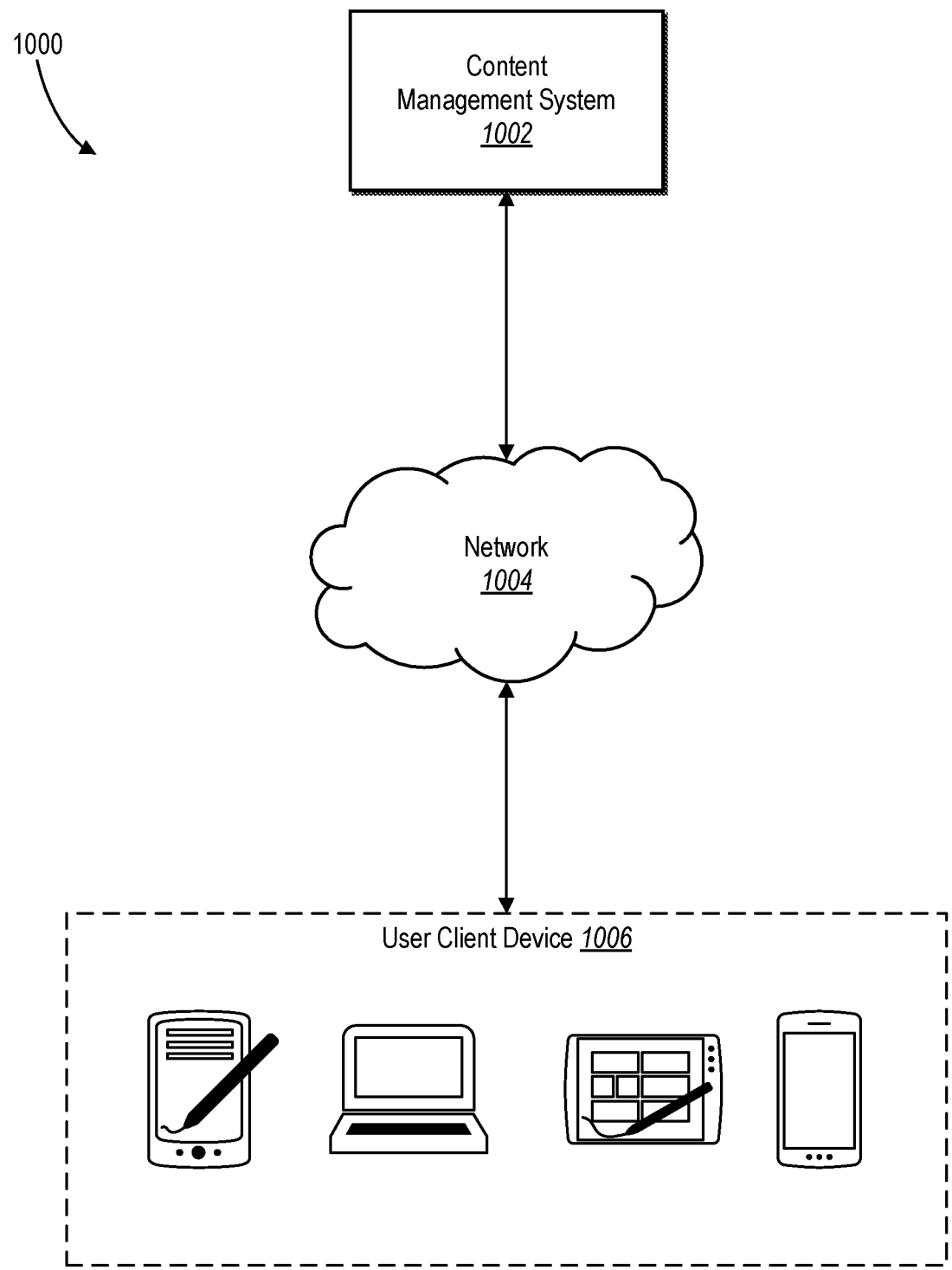
FIG. 10 illustrates an example environment of a networking system having the DAG framework execution system in accordance with one or more embodiments.

FIG. 10 is a schematic diagram illustrating environment 1000 within which one or more implementations of the DAG framework execution system 102 can be implemented. For example, the DAG framework execution system 102 may be part of a content management system 1002 (e.g., the content management system 106). Content management system 1002 may generate, store, manage, receive, and send digital content (such as digital content items). For example, content management system 1002 may send and receive digital content to and from client device of client devices 1006 by way of network 1004. In particular, content management system 1002 can store and manage a collection of digital content. Content management system 1002 can manage the sharing of digital content between computing devices associated with a plurality of users. For instance, content management system 1002 can facilitate a user sharing a digital content with another user of content management system 1002.

In particular, content management system 1002 can manage synchronizing digital content across multiple client devices 1006 associated with one or more users. For example, a user may edit digital content using a client device of the client device 1006. The content management system 1002 can cause client device of the client devices 1006 to send the edited digital content to content management system 1002. Content management system 1002 then synchronizes the edited digital content on one or more additional computing devices.

In addition to synchronizing digital content across multiple devices, one or more implementations of content management system 1002 can provide an efficient storage option for users that have large collections of digital content. For example, content management system 1002 can store a collection of digital content on content management system 1002, while the client device of the client devices 1006 only stores reduced-sized versions of the digital content. A user can navigate and browse the reduced-sized versions (e.g., a thumbnail of a digital image) of the digital content on client device of the client devices 1006. In particular, one way in which a user can experience digital content is to browse the reduced-sized versions of the digital content on client device of client devices 1006.

Another way in which a user can experience digital content is to select a reduced-size version of digital content to request the full- or high-resolution version of digital content from content management system 1002. In particular, upon a user selecting a reduced-sized version of digital content, client device of client devices 1406sends a request to content management system 1002 requesting the digital content associated with the reduced-sized version of the digital content. Content management system 1002 can respond to the request by sending the digital content to client device of client devices 1006. Client device of client devices 1006, upon receiving the digital content, can then present the digital content to the user. In this way, a user can have access to large collections of digital content while minimizing the amount of resources used on client device of client devices 1006.

client device of client devices 1006 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. client device of client devices 1006 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 1004.

Network 1004 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client device of client devices 1006 may access content management system 1002.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A system comprising:
   at least one processor; and
   a non-transitory computer-readable medium storing instructions which, when executed by the at least one processor, cause the system to:
      receive a search request at a search engine of a content management system;
      in response to the search request, determine, within a directed acyclic graph comprising a plurality of nodes defining computer operations for performing data searches within the content management system, an initial node and a final node in a node path comprising a set of nodes from the directed acyclic graph corresponding to the search request;
      determine two or more nodes of the set of nodes to execute in parallel between the initial node and the final node; and
      perform a data search for the search request by executing operations defined by the two or more nodes along the node path within the directed acyclic graph.

2. The system of claim 1, further storing instructions which, when executed by the at least one processor, cause the system to:
   receive an additional search request at the search engine of the content management system; and
   in response to the additional search request, determine an additional node path, the additional node path comprising nodes from the directed acyclic graph with a different ordering of nodes than the node path as indicated by the additional search request.

3. The system of claim 1, further storing instructions which, when executed by the at least one processor, cause the system to:
   determine a critical path of the directed acyclic graph; and
   based on the critical path, generate a notification comprising a suggestion to split one or more nodes along the node path for decreasing a time to execute operations defined by the one or more nodes.

4. The system of claim 1, further storing instructions which, when executed by the at least one processor, cause the system to:
   determine an execution time for performing an operation for a node along the node path; and
   generate a suggestion to modify the node along the node path based on the execution time.

5. The system of claim 1, further storing instructions which, when executed by the at least one processor, cause the system to perform a static validity check of the directed acyclic graph prior to executing the operations.

6. The system of claim 1, further storing instructions, which when executed by the at least one processor cause the system to:
   determine the initial node in the node path based on initialization data included accompanying the search request; and determine the final node in the node path based on requested output data indicated by the search request.

7. A computer-implemented method comprising:
receiving a search request at a search engine of a content management system;
in response to the search request, determining, within a directed acyclic graph comprising a plurality of nodes defining computer operations for performing data searches within the content management system, an initial node and a final node in a node path comprising a set of nodes from the directed acyclic graph corresponding to the search request;
determining two or more nodes of the set of nodes to execute in parallel between the initial node and the final node; and
performing a data search for the search request by executing operations defined by nodes along the node path within the directed acyclic graph.

8. The computer-implemented method of claim 7, wherein receiving the search request comprises one or more of:
receiving, from a client device, an indication of a user interaction requesting a digital content search for a search query; or
receiving, from a networking device in communication with the content management system, network data requesting performance of a search function by the search engine of the content management system.

9. The computer-implemented method of claim 7, wherein:
the directed acyclic graph comprises interconnected nodes defined by computer code, wherein one or more of the interconnected nodes is executable in parallel; and
the directed acyclic graph comprises no loops between a downstream node and a previous upstream node.

10. The computer-implemented method of claim 7, wherein determining the node path comprises:
determining operations of at least one node within the directed acyclic graph to execute in series separately from the two or more nodes of the set of nodes that are executed in parallel within the directed acyclic graph between the initial node and the final node.

11. The computer-implemented method of claim 7, wherein determining the node path comprises:
determining the initial node of the set of nodes based on initialization data accompanying the search request; and
determining the final node of the set of nodes based on requested output data indicated by the search request.

12. The computer-implemented method of claim 7, wherein performing the data search comprises concurrently executing operations of two or more additional nodes between the initial node and the final node compatible with parallel execution together.

13. The computer-implemented method of claim 7, wherein performing the data search comprises:
generating node data by executing an operation for a node along the node path; and
passing the node data to one or more additional nodes along the node path, wherein the one or more additional nodes define the node data as input.

14. The computer-implemented method of claim 7, wherein performing the data search comprises determining, based on the search request, one or more nodes within the directed acyclic graph to omit from the node path.

15. A non-transitory computer-readable medium storing executable instructions which, when executed by at least one processor, cause the at least one processor to:
receive a search request at a search engine of a content management system;
in response to the search request, determine, within a directed acyclic graph comprising a plurality of nodes defining computer operations for performing data searches within the content management system, an initial node and a final node in a node path comprising a set of nodes from the directed acyclic graph corresponding to the search request;
determine two or more nodes of the set of nodes to execute in parallel between the initial node and the final node;
perform a data search for the search request by executing operations defined by nodes along the node path within the directed acyclic graph; and
provide output data from the data search to a computing device that initiates the search request.

16. The non-transitory computer-readable medium of claim 15, further storing instructions which, when executed by the at least one processor, cause the at least one processor to receive, from the computing device, an indication of a user interaction inputting one or more text characters to request a digital content item from the content management system.

17. The non-transitory computer-readable medium of claim 15, further storing instructions which, when executed by the at least one processor, cause the at least one processor to perform the data search by concurrently executing operations of two or more additional nodes of the plurality of nodes within the directed acyclic graph between the initial node and the final node that are compatible with parallel execution together.

18. The non-transitory computer-readable medium of claim 15, further storing instructions which, when executed by the at least one processor, cause the at least one processor to:
determine, based on the search request, one or more nodes within the directed acyclic graph to omit from the node path;
determine operations of the two more nodes of the set of nodes between the initial node and the final node within the directed acyclic graph to execute in parallel for the search request; and
determine operations of at least one node within the directed acyclic graph to execute in series separately from the two or more nodes within the directed acyclic graph.

19. The non-transitory computer-readable medium of claim 15, further storing instructions which, when executed by the at least one processor, cause the at least one processor to:
generate node data by executing an operation for a node along the node path; and
pass the node data to multiple nodes along the node path, wherein the multiple nodes execute operations in parallel and define the node data as input.

20. The non-transitory computer-readable medium of claim 15, wherein executing the operations defined by the nodes along the node path further comprises:
executing a first node of the node path that authenticates a user account of a client device in parallel with a second node of the node path that obtains user signals of the client device; and after executing the first node and the second node in parallel, executing a third node of the node path that determines shared files accessible by the user account.

* * * * *